United States Patent
Muraoka et al.

(10) Patent No.: US 8,884,483 B2
(45) Date of Patent: Nov. 11, 2014

(54) OPTICAL ENTIRE-CIRCUMFERENCE ENCODER AND MOTOR SYSTEM

(71) Applicant: Kabushiki Kaisha Yaskawa Denki, Kitakyushu (JP)

(72) Inventors: Jiro Muraoka, Kitakyushu (JP); Sadatoshi Inoue, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 229 days.

(21) Appl. No.: 13/644,315

(22) Filed: Oct. 4, 2012

(65) Prior Publication Data

US 2013/0088126 A1 Apr. 11, 2013

(30) Foreign Application Priority Data

Oct. 5, 2011 (JP) ................................ 2011-221409

(51) Int. Cl.
*H02K 11/00* (2006.01)
(52) U.S. Cl.
USPC ..................................... 310/68 B; 250/231.13
(58) Field of Classification Search
USPC .......... 310/68 B; 250/213.13, 213.14, 213.16
See application file for complete search history.

(56) References Cited

U.S. PATENT DOCUMENTS

| | | | | |
|---|---|---|---|---|
| 7,405,392 B2 * | 7/2008 | Musha et al. | ............ | 250/231.13 |
| 7,714,272 B2 * | 5/2010 | Urabe | ........................ | 250/231.13 |
| 8,124,928 B2 * | 2/2012 | Villaret | ..................... | 250/231.13 |
| 2002/0070334 A1 * | 6/2002 | Hasegawa et al. | ........ | 250/231.13 |
| 2006/0108516 A1 | 5/2006 | Villaret | | |
| 2007/0272840 A1 * | 11/2007 | Musha et al. | ............ | 250/231.13 |
| 2010/0163716 A1 * | 7/2010 | Villaret | ..................... | 250/227.28 |
| 2011/0227518 A1 * | 9/2011 | Inoue et al. | ................. | 318/400.4 |

FOREIGN PATENT DOCUMENTS

JP  2006-515426  5/2006

* cited by examiner

*Primary Examiner* — Thanh Lam
(74) *Attorney, Agent, or Firm* — Mori & Ward, LLP

(57) ABSTRACT

An optical entire-circumference encoder includes a substrate. A light source is disposed on a rotation axis and a first surface of the substrate. A disc, rotatable about the rotation axis, is disposed on a second surface of the substrate. The disc includes first and second rotation tracks each including rotating slits. A light guiding unit radially guides light from the light source toward an entire outer circumference of the disc to the first and second rotation tracks. The light guiding unit includes a first light guiding section and second light guiding sections. The first light guiding section includes a ring-shaped surface directly or indirectly opposed to a rotation track. The first light guiding section radially guides the light out from the ring-shaped surface toward the first rotation track. The second light guiding sections guide part of the radially guided light to the second rotation track.

11 Claims, 14 Drawing Sheets

OPTICAL ENTIRE-CIRCUMFERENCE ENCODER AND MOTOR SYSTEM

CROSS-REFERENCE TO RELATED APPLICATIONS

The present application claims priority under 35 U.S.C. §119 to Japanese Patent Application No. 2011-221409, filed Oct. 5, 2011. The contents of this application are incorporated herein by reference in their entirety.

BACKGROUND OF THE INVENTION

1. Field of the Invention

The present invention relates to an optical entire-circumference encoder and a motor system.

2. Discussion of the Background

Optical encoders are used to measure physical quantities, such as position and speed, of moving objects. Some optical encoders use fixed slits corresponding to rotating slits formed on a disc so as to cause reflected light or transmitted light to occur corresponding to rotation of the disc. For highly accurate position detection, such optical encoders require highly accurate adjustment of the position relationship between the rotating slits and the fixed slits. This is because if an error exists in the position relationship between the fixed slits and the rotating slits, the error causes reflected light and transmitted light unnecessary in design viewpoints to be received by the photodetector, resulting in increased noise. To reduce such noise, rotary encoders of optical entire-circumference correction type (hereinafter also referred to as "optical entire-circumference encoders") are under development (see, for example, Japanese Translation of PCT International Application Publication No. 2006-515426).

SUMMARY OF THE INVENTION

According to one aspect of the present invention, an optical entire-circumference encoder includes a substrate, a light source, a disc, and a light guiding unit. The substrate includes a first surface and a second surface. The light source is disposed on a rotation axis and disposed on the first surface of the substrate. The disc is disposed on the second surface of the substrate and rotatable about the rotation axis. The disc includes a first rotation track and a second rotation track each including a plurality of rotating slits disposed around the rotation axis. The light guiding unit is configured to radially guide light radiated from the light source toward an approximately entire outer circumferential area of the disc so as to guide the light to the first rotation track and the second rotation track. The light guiding unit includes a first light guiding section and at least two second light guiding sections. The first light guiding section includes an approximately ring-shaped surface directly or indirectly opposed to a rotation track among the rotation tracks. The first light guiding section is configured to radially guide the light so as to make the light go out from the approximately ring-shaped surface toward the first rotation track. The at least two second light guiding sections are configured to guide part of the radially guided light to the second rotation track.

According to another aspect of the present invention, a motor system includes a motor, an optical entire-circumference encoder, and a controller. The motor is configured to rotate a rotating shaft. The optical entire-circumference encoder is coupled to the rotating shaft to detect a position of the rotating shaft. The controller is configured to control rotation of the motor based on the position detected by the optical entire-circumference encoder. The optical entire-circumference encoder includes a substrate, a light source, a disc, and a light guiding unit. The substrate includes a first surface and a second surface. The light source is disposed on a rotation axis of the rotating shaft and disposed on the first surface of the substrate. The disc is disposed on the second surface of the substrate and rotatable about the rotation axis. The disc includes a first rotation track and a second rotation track each including a plurality of rotating slits disposed around the rotation axis. The light guiding unit is configured to radially guide light radiated from the light source toward an approximately entire outer circumferential area of the disc so as to guide the light to the first rotation track and the second rotation track. The light guiding unit includes a first light guiding section and at least two second light guiding sections. The first light guiding section includes an approximately ring-shaped surface directly or indirectly opposed to a rotation track among the rotation tracks. The first light guiding section is configured to radially guide the light so as to make the light go out from the approximately ring-shaped surface toward the first rotation track. The at least two second light guiding sections are configured to guide part of the radially guided light to the second rotation track.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
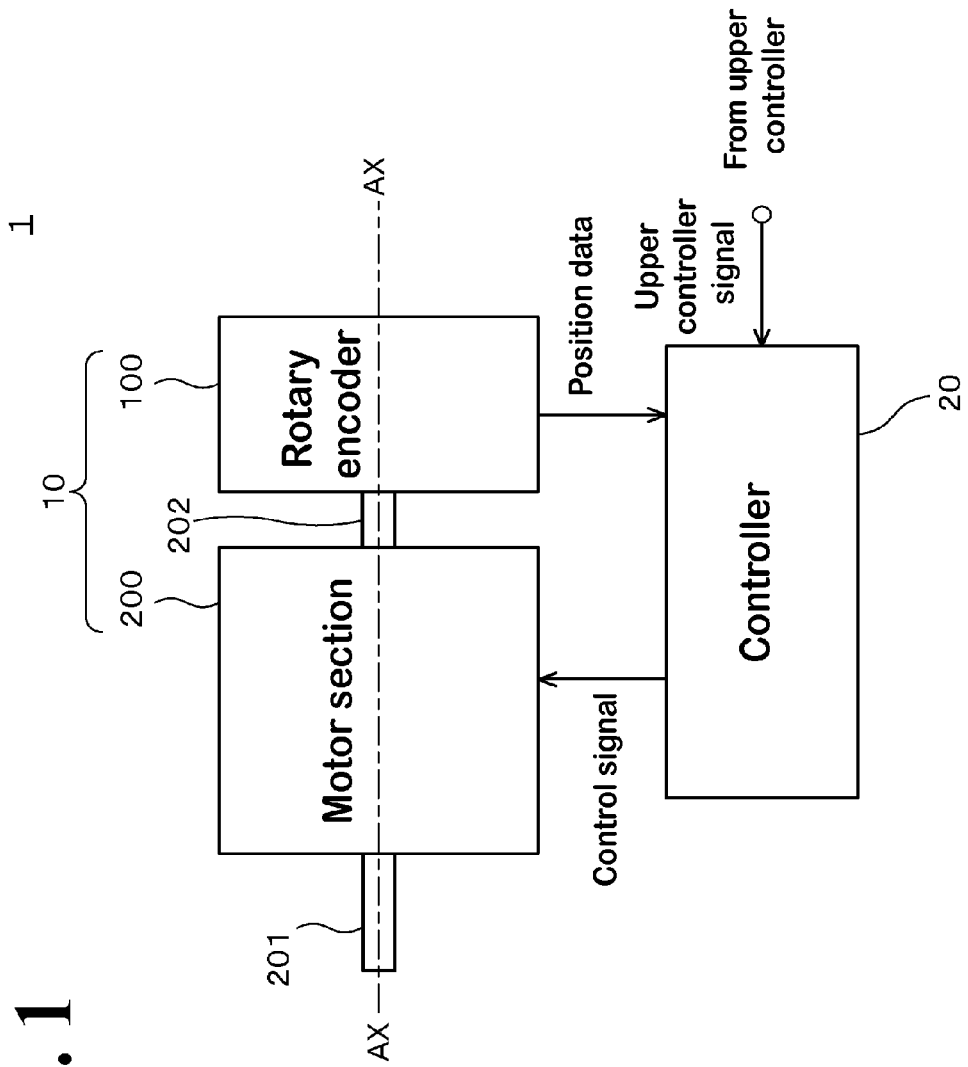
FIG. 1 is a diagram illustrating a configuration of a motor system according to a first embodiment of the present invention.

The embodiments will now be described with reference to the accompanying drawings, wherein like reference numerals designate corresponding or identical elements throughout the various drawings.

An embodiment of the present invention described below takes a rotary motor system including a rotary optical encoder as an example. Specifically, the optical entire-circumference encoder according to the embodiment is applied to a rotary motor system (hereinafter also referred to as "motor system") to measure position data including a rotation angle (also referred to as "position") of a shaft (an example of the rotating object) of a motor disposed in the motor system. It will be readily appreciated, however, that the optical entire-circumference encoder according to the embodiment also finds applications in various other rotating objects, such as prime movers and steering, that rotate about certain rotation axes.

To facilitate the understanding of the embodiment of the present invention, the description will proceed in the following order.

1. First Embodiment
1-1. Rotary Motor System According to the First Embodiment
1-2. Configuration of Encoder According to the First Embodiment
1-3. Operation of Encoder According to the First Embodiment
1-4. Examples of Advantageous Effects of the First Embodiment
2. Modifications and Other Notifications 1. First Embodiment 1-1. Rotary Motor System According to the First Embodiment First, a configuration of a motor system according to the first embodiment of the present invention will be described by referring to FIG. 1. FIG. 1 is a diagram illustrating a configuration of the motor system according to the first embodiment of the present invention.

As shown in FIG. 1, a motor system 1 according to this embodiment includes a motor 10 and a controller 20. The motor 10 includes an optical entire-circumference encoder (hereinafter simply also referred to as "encoder") 100 of optical system and a motor section 200.

The motor section 200 is an example of the power source excluding the encoder 100. The motor section 200 will occasionally be simply referred to as motor. The motor section 200 includes a rotating shaft 201 at least on one side, and rotates this rotating shaft 201 about a rotation axis AX to output rotational force.

The motor section 200 is not intended in a limiting sense, and any other servo motor is possible insofar as it is controlled based on position data. The motor section 200 as a power source will not be particularly limited to an electric motor section, with the use of electricity. Other examples of power source include a hydraulic motor section, a pneumatic motor section, and a steam motor section. For the sake of description, the motor section 200 in the following description will be assumed an electric motor section.

The encoder 100 is coupled to an end (anti-load side end) 202, which is on the opposite side of an output end (load-side end) of the rotating shaft 201 from which rotational force is output, so as to detect position data of the rotating shaft 201 (an example of the rotating object). The position where the encoder 100 is disposed will not be particularly limited. For example, the encoder 100 may be coupled to a rotating object, such as the rotating shaft 201, through other mechanisms such as a reducer and a rotation direction changing mechanism.

The following assumes that the position data detected by the encoder 100 according to this embodiment includes position (rotation angle, which will be hereinafter also referred to as, for example, "motor position") of the rotating shaft 201 and other elements, and speed (rotation speed, which will be hereinafter also referred to as, for example, "motor speed") including the rotation directions of the rotating shaft 201 and other elements. The encoder 100 according to this embodiment may only detect rotation direction, without motor speed, and may further detect acceleration (angular acceleration, hereinafter also referred to as, for example, "motor acceleration") of the rotating shaft 201 and other elements.

The controller 20 acquires position data output from the encoder 100, and based on this position data, controls rotation of the motor section 200. Thus, in this embodiment, where an electric motor section is used as the motor section 200, the controller 20 controls current, voltage, or the like to be applied to the motor section 200 based on the position data so as to control rotation of the motor section 200. Additionally, the controller 20 is capable of acquiring an upper control signal from an upper controller (not shown) and of controlling the motor section 200 to cause the rotating shaft 201 of the motor section 200 to output position, speed, or the like indicated by this upper control signal. When the motor section 200 uses another source of power such as of hydraulic pressure, pneumatic, and steam, the controller 2 may control supply of this another source of power so as to control rotation of the motor section 200.

1-2. Configuration of Encoder According to the First Embodiment

Figure 2:
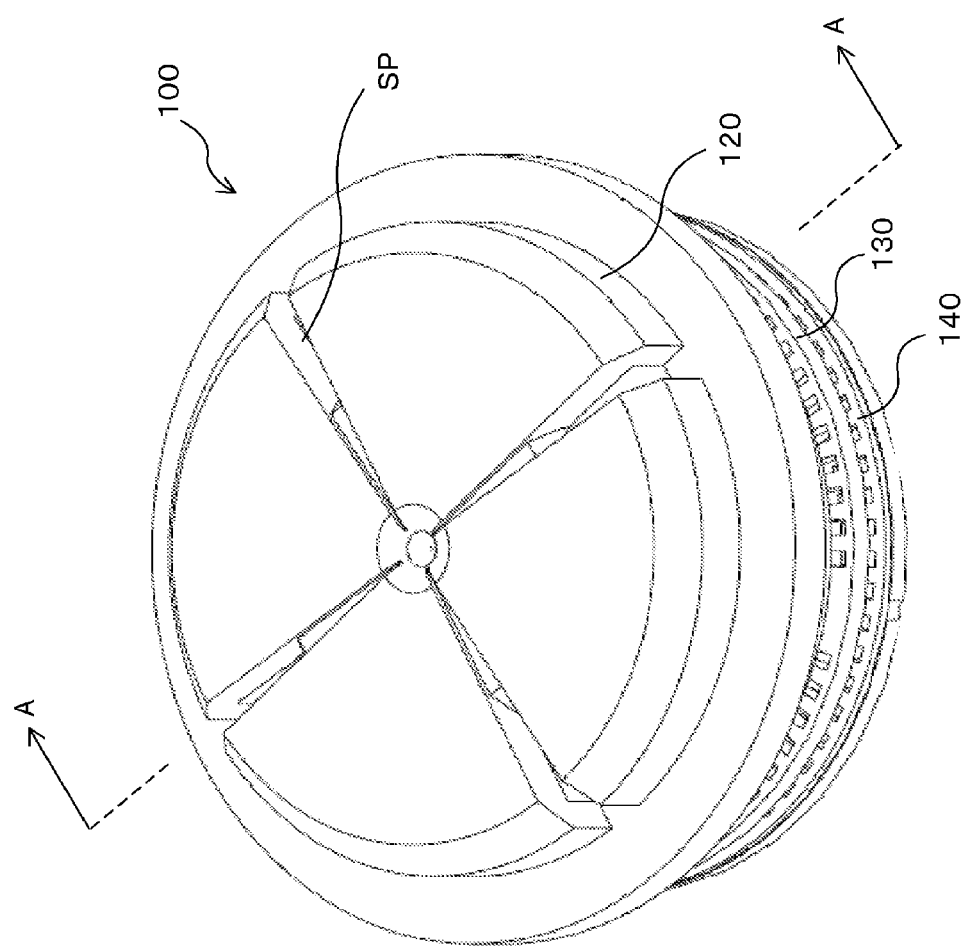
FIG. 2 is a diagram illustrating a configuration of an encoder according to the embodiment.
Figure 3:
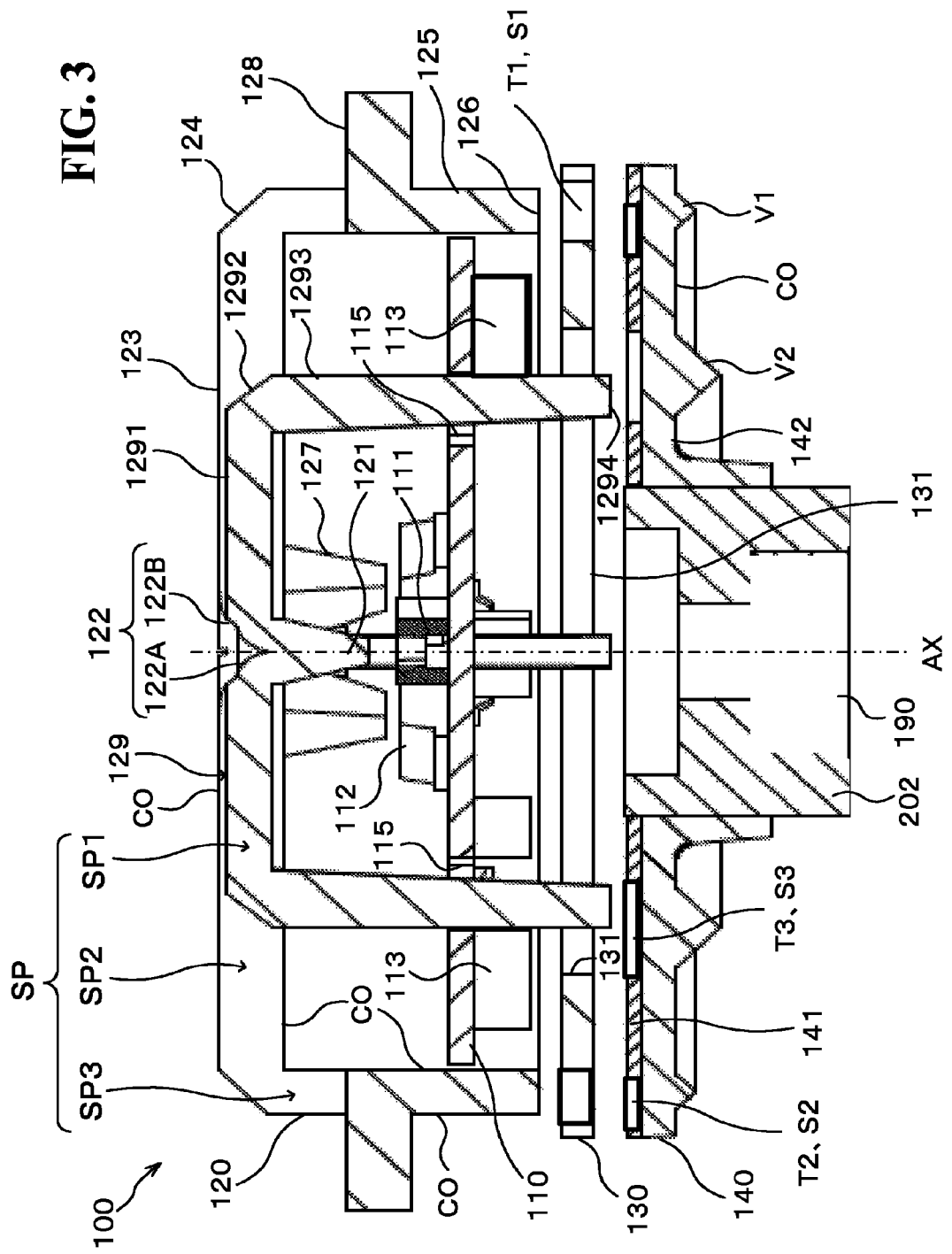
FIG. 3 is a diagram illustrating a configuration of the encoder according to the embodiment.

Next, referring to FIGS. 2 and 3, a configuration of the encoder 100 according to this embodiment will be described. FIGS. 2 and 3 are diagrams each illustrating a configuration of the optical entire-circumference encoder according to this embodiment. FIG. 2 is a view of the encoder 100 according to this embodiment from an upper perspective, illustrating a partial configuration of the encoder 100, and FIG. 3 is a cross-sectional view of the encoder 100 taken along the line A-A shown in FIG. 2.

As shown in FIGS. 2 and 3, the encoder 100 according to this embodiment roughly includes a substrate 110, a light guiding unit 120, a mask 130, and a disc 140. In the following, these elements will be described by referring to the drawings as necessary, followed by description of light flow, its detection principle, and other things in connection with operation of the encoder 100. For the sake of description, in the following description, the motor section 200 side (shaft end 202 side) of a rotation axis AX will also be referred to as "downward" and "under", a direction away from the motor section 200 will also be referred to as "upward" and "above", and a direction perpendicular to the rotation axis AX will also be referred to as "lateral" and "diameter direction". It will be readily appreciated that the encoder 100 according to this embodiment is not restricted within the upward and downward concept, and may be arranged in any other postures.

Substrate 110

Figure 4:
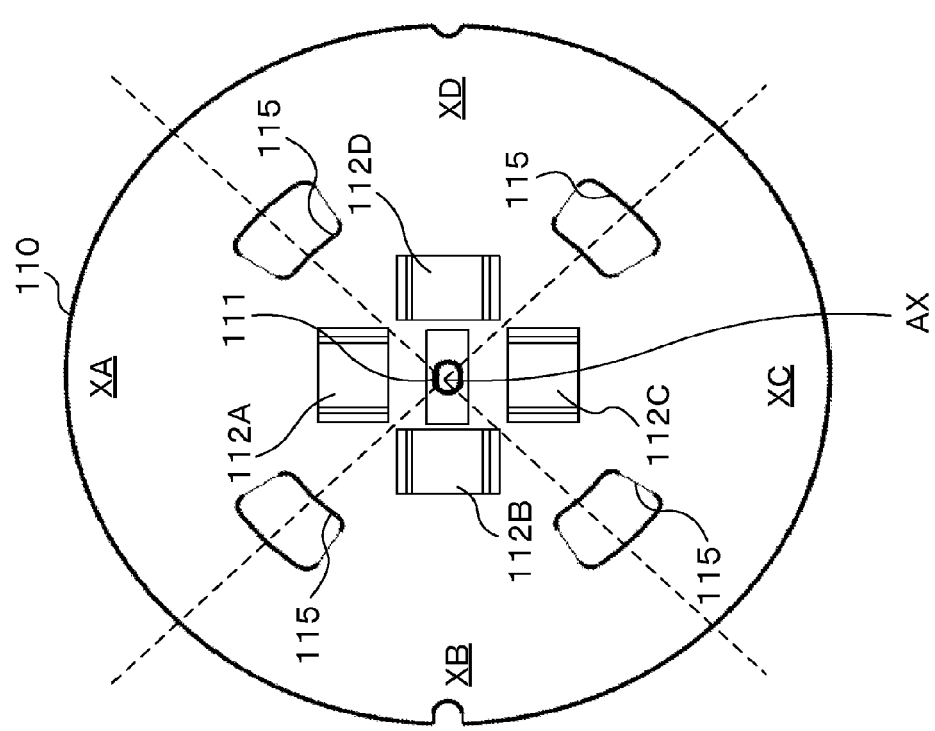
FIG. 4 is a diagram illustrating a configuration of a substrate according to the embodiment.
Figure 5:
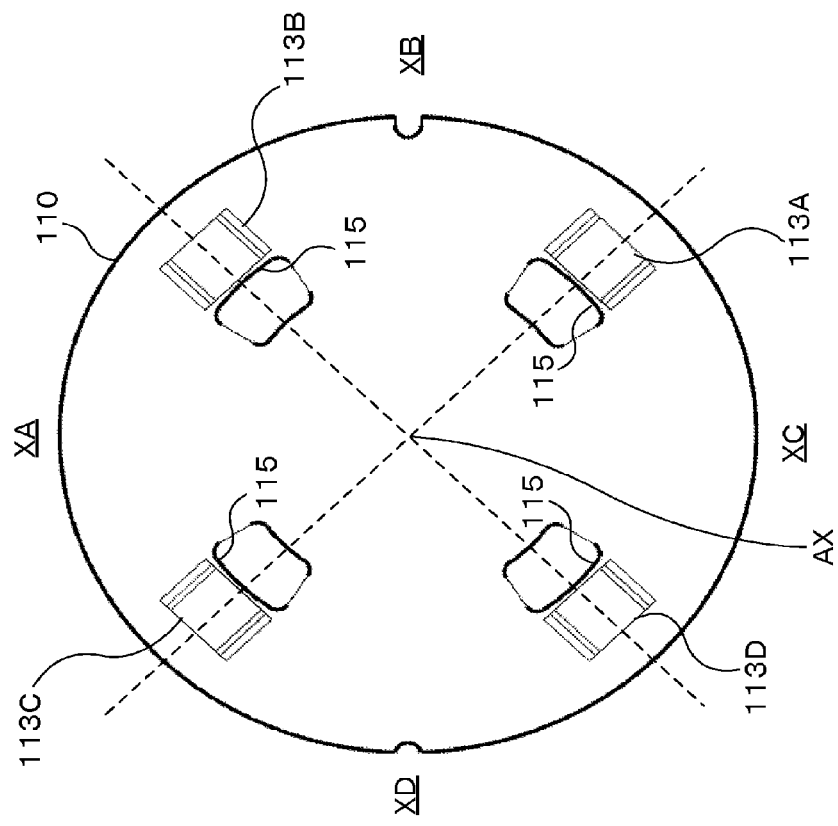
FIG. 5 is a diagram illustrating a configuration of the substrate according to the embodiment.
Figure 13:
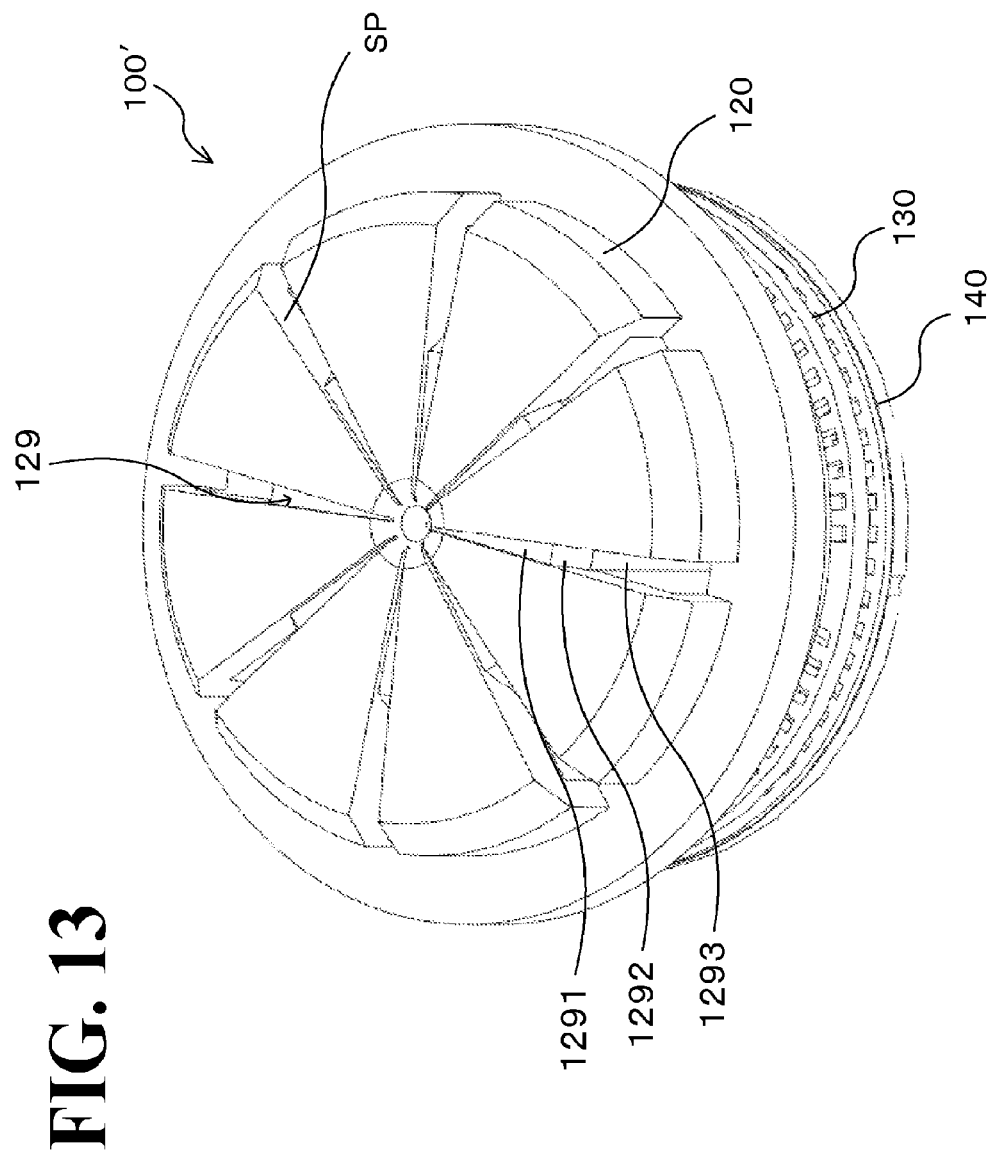
FIG. 13 is a diagram illustrating a configuration of an encoder according to a modification.

As shown in FIG. 3, the substrate 110 includes a light emitter 111, a light receiver 112, an absolute detector 113, and a signal processor 114 (see FIG. 13). The substrate 110 is disposed above the mask 130. FIGS. 4 and 5 show a configuration of the substrate 110. FIGS. 4 and 5 are diagrams each illustrating a configuration of the substrate according to this embodiment. FIG. 4 is a view on the upper surface of the substrate 110, and FIG. 5 is a view on the lower surface of the substrate 110.

The light emitter 111 is an example of the light source, and disposed on the upper surface of the substrate 110 on the rotation axis AX, as shown in FIG. 4. The light emitter 111 generates light upward along the rotation axis AX. The light that the light emitter 111 generates may be any of various kinds of light including laser light, parallel light, diverging light, and convergent light, and there is no particular limitation to the wavelength of the light.

The light receiver 112 is an example of the at least two light receivers, and in this embodiment, includes four light receivers 112A to 112D, as shown in FIG. 4. The light receivers 112A to 112D are respectively disposed in four areas XA to XD and adjacent the rotation axis AX as if to surround the light emitter 111 on the upper surface of the substrate 110. In this embodiment, the four areas XA to XD are set to have point symmetries relative to the rotation axis AX, and accordingly, the light receivers 112A to 112D are also disposed to have point symmetries relative to the rotation axis AX. The light receivers 112A to 112D receive light respectively in the areas XA to XD to generate light reception signals. That is, in this embodiment, four light reception signals are generated respectively in the areas XA to XD.

In this embodiment, the mask 130 includes a plurality of fixed slits S1, as described later, which are divided into the four areas XA to XD having point symmetry relative to the rotation axis AX. Thus, as with the light receivers 112A to 112D, four pieces are disposed for each element described later. The number of the areas set on the mask 130, however, may be any other number that is equal to or less than two, and the positions where the areas are set may not necessarily be point symmetry. In this case, the light receiver 112 and other configurations are preferably disposed in accordance with the number of the areas and the positions where the areas are set. When the number of the areas is an integral multiple of four, the encoder 100 according to this embodiment further enhances the advantageous effect of reducing the influence of displacement. The resistance against displacement is further enhanced when the areas are formed in point symmetry.

The absolute detector 113 in this embodiment includes four absolute detectors 113A to 113D. As shown in FIG. 5, the absolute detectors 113A to 113D are disposed in point symmetry at positions away from the rotation axis AX on the lower surface of the substrate 110. As the absolute detectors 113A to 113D, it is possible to use, for example, photodetectors. The absolute detectors 113A to 113D receive a reflection of light that was emitted from the light emitter 111 and guided to the disc 140 by an absolute-purpose light guiding section 129, described later. As a result, the absolute detectors 113A to 113D generate light reception signals. The light reception signals that the absolute detectors 113A to 113D generate each include information of absolute position, which is used in calculation of the motor position described later. The number and the disposed position of each absolute detector 113 will not be limited to this embodiment, and any other configuration is possible insofar as the absolute value of the motor position is detectable.

As the absolute detectors, it is possible to use, for example, receiving-emission integral devices. In this case, both the light from the light emitter 111 and the light from each absolute detector can be utilized for absolute detection, which increases the amount of light reception at each absolute detector and improves detection accuracy.

The signal processor 114, not shown in FIGS. 4 and 5, is disposed in the substrate 110. The signal processor 114 acquires the light reception signals from the light receiver 112 and the absolute detector 113, and from these plurality of light reception signals, generates position data including motor position (including absolute value) and motor speed (including rotation direction). The generated position data is transmitted to the controller 20. The signal processor 114, and its configuration, will be described in connection with operation of the encoder 100 (see FIG. 13). Additionally, the signal processor 114 may be disposed in any other configuration of the encoder 100 than the substrate 110 or may be disposed in the controller 20, as opposed to this embodiment. The signal processor 114 may also be disposed in other configuration than the encoder 100 and the controller 20.

As shown in FIGS. 4 and 5, the substrate 110 includes as many through holes 115 as the absolute detectors 113. The through holes 115 permit the absolute-purpose light guiding section 129, described later, to pass through the substrate 110 from the upward direction to the downward direction. In this example, the through holes 115 are disposed at positions that correspond to the respective absolute detectors 113 and that are further outward than the light receivers 112 and further inward than the absolute detectors 113.

Light Guiding Unit 120

The light guiding unit 120 is mainly made of a light transmitting material such as glass material and plastic material, and extends from the rotation axis AX over to the mask 130 with the substrate 110 disposed between the light guiding unit 120 and the mask 130 (fixed track T1) as if to cover approximately the entire upper and lateral sides of the substrate 110. The light guiding unit 120 laterally radiates light emitted from the light emitter 111 (in other words, radially guides the light approximately in all directions of the outer circumference of the disc 140), and then guides this light downward and radiates the light approximately over the entire circumference of the fixed track T1 of the mask 130. In addition, once the light is transmitted approximately thoroughly through a plurality of fixed slits and a plurality of rotating slits, described later, the light guiding unit 120 guides the light, while concentrating it, toward adjacent the rotation axis AX through a similar optical path to the one used in the above-described radiation, and radiates the light to the light receiver 112. Here, the part of this light flow through which to radiate light to the mask 130 will also be referred to as "forward path", while the other part of the light flow through which to radiate returning light from the mask 130 and other elements to the light receiver 112 will also be referred to as "returning path". The light guiding unit 120 also guides part of the radially guided light in the downward direction, and radiates this light to a rotation track T3, described later.

Figure 6:
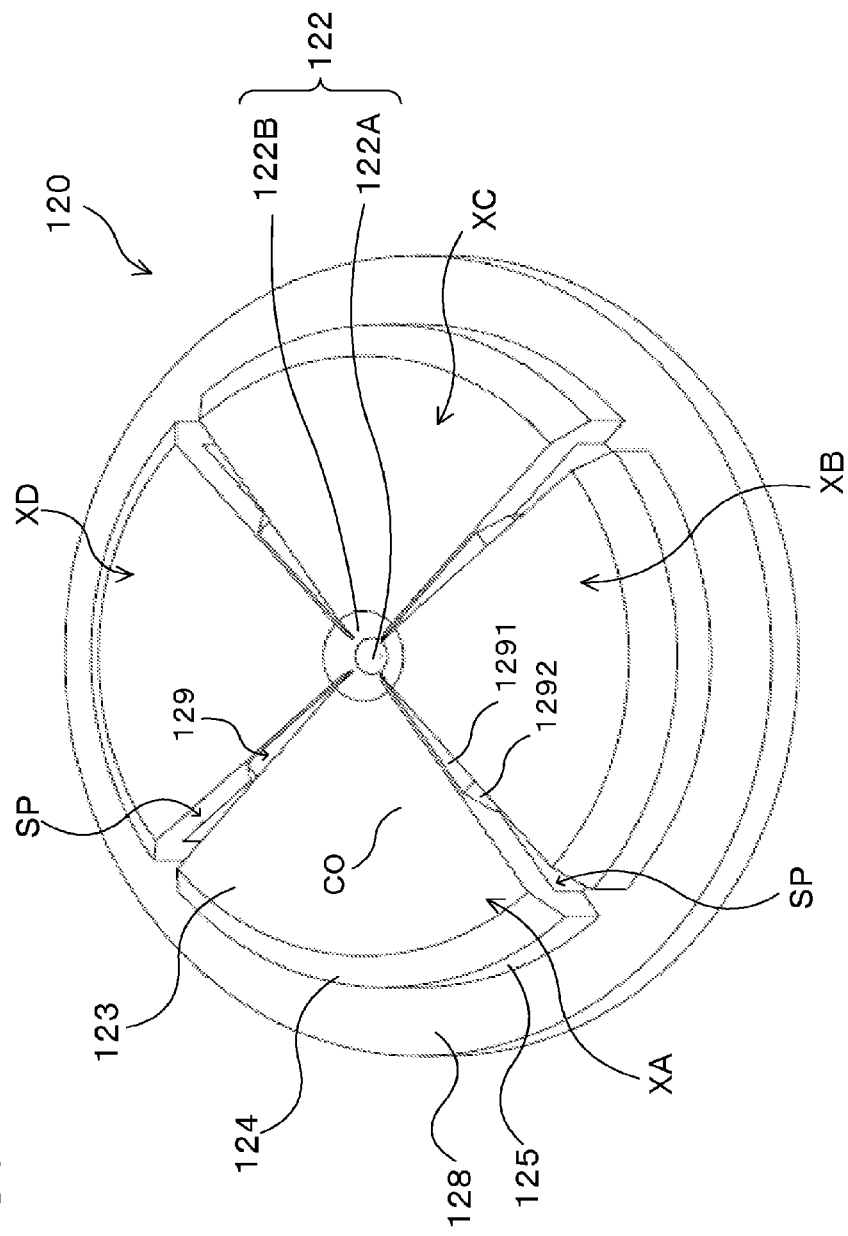
FIG. 6 is a diagram illustrating a configuration of a light guiding unit according to the embodiment.
Figure 7:
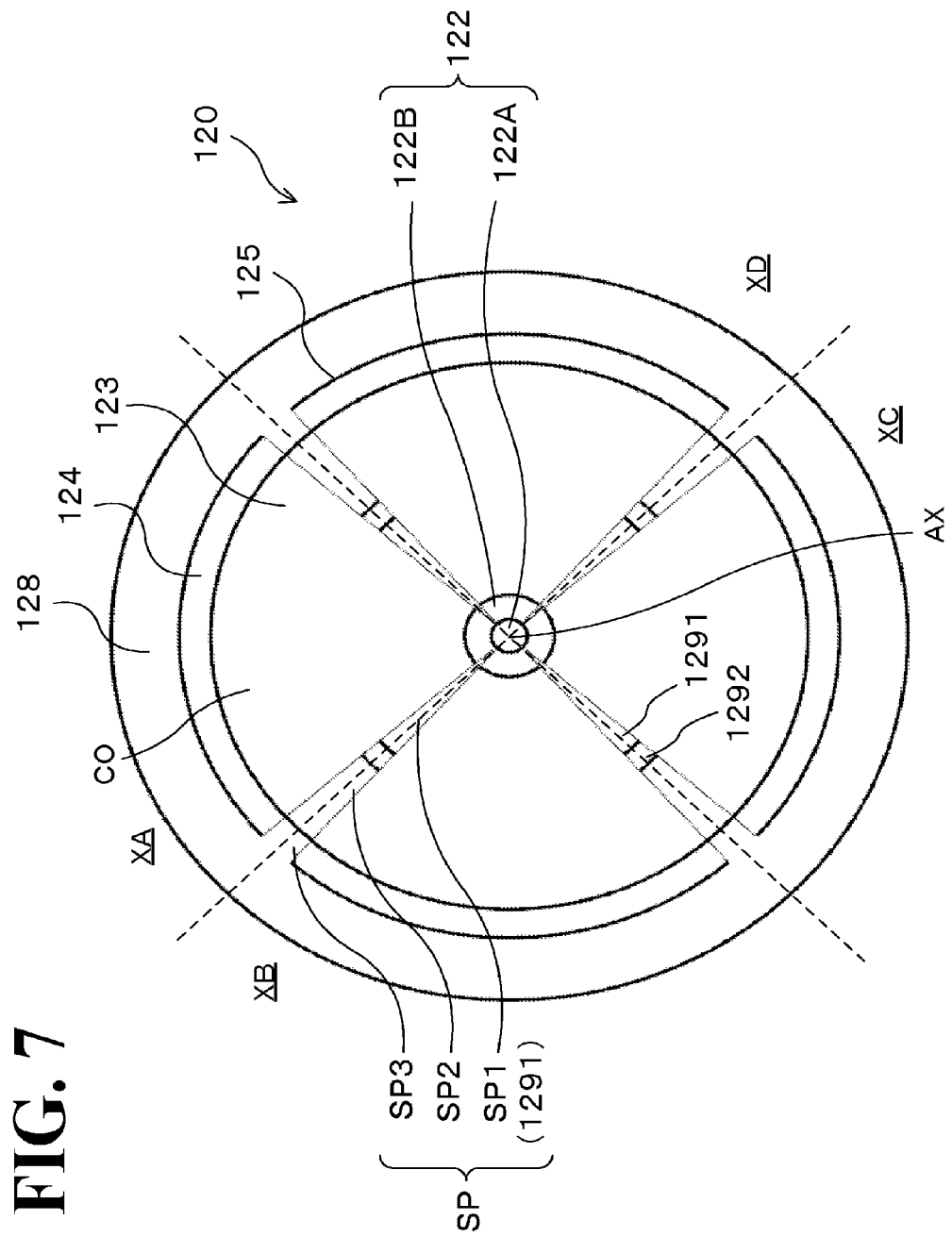
FIG. 7 is a diagram illustrating a configuration of the light guiding unit according to the embodiment.
Figure 8:
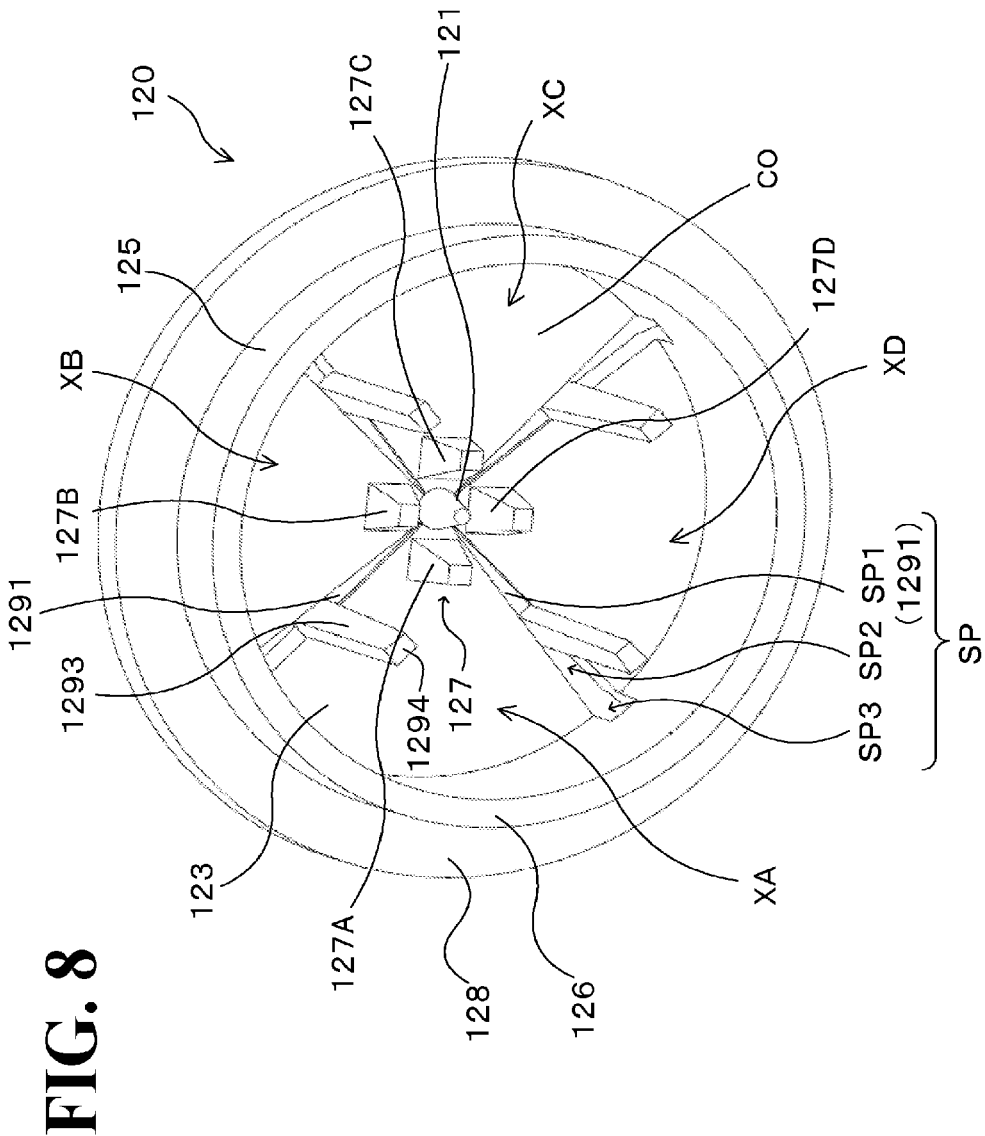
FIG. 8 is a diagram illustrating a configuration of the light guiding unit according to the embodiment.
Figure 9:
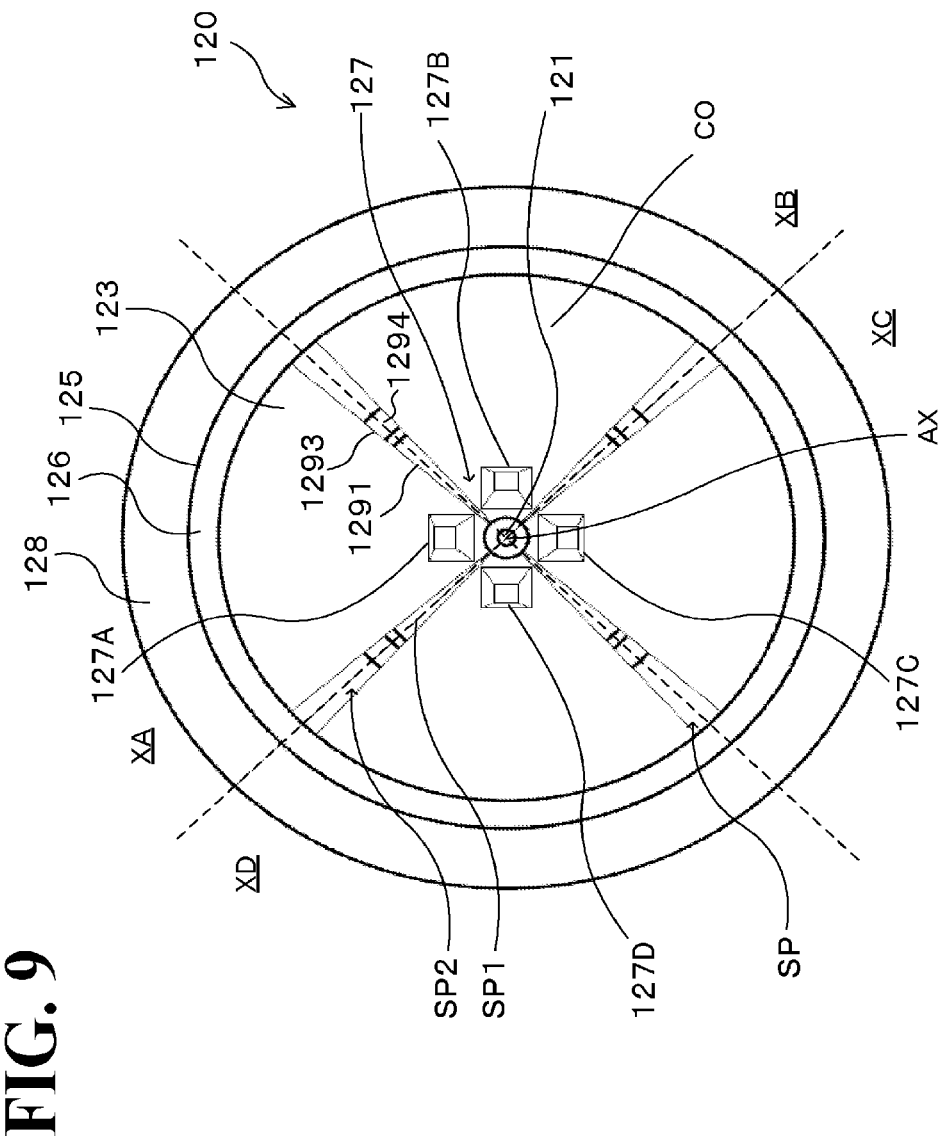
FIG. 9 is a diagram illustrating a configuration of the light guiding unit according to the embodiment.

Configurations and other things related to the light guiding unit 120 will be described in detail by referring to FIGS. 3 and 6 to 9. FIGS. 6 to 9 are diagrams each illustrating a configuration of the light guiding unit according to this embodiment. FIG. 6 is a view of the light guiding unit 120 from an upper perspective. FIG. 7 is a plan view of the light guiding unit 120. FIG. 8 is a view of the light guiding unit 120 from a lower perspective. FIG. 9 is a bottom view of the light guiding unit 120.

As shown in FIGS. 3, 6, and 8, the light guiding unit 120 roughly includes a light entrance section 121, a radiating-concentrating section 122, an incremental-purpose first light guiding section 123, a direction conversion surface 124, an incremental-purpose second light guiding section 125, a radiation entrance surface 126, a light exit section 127, a flange 128, an absolute-purpose light guiding section 129, a coating CO, and a light shield SP. The incremental-purpose first light guiding section 123, the direction conversion surface 124, the incremental-purpose second light guiding section 125, and the radiation entrance surface 126 are examples of the first light guiding section. The absolute-purpose light guiding section 129, which is an example of the second light guiding section, includes absolute-purpose first light guides 1291, direction conversion surfaces 1292, absolute-purpose second light guides 1293, and radiation surfaces 1294.

As shown in FIGS. 8 and 9, the light entrance section 121 is disposed on the rotation axis AX, and extends along the rotation axis AX from the incremental-purpose first light guiding section 123 toward the light emitter 111. The light emitted from the light emitter 111 enters the light entrance section 121, which in turn guides the light upward. Here, the light entrance section 121 preferably has a cylindrical shape with an incremental radius toward the upward direction. The light that has entered through the light entrance section 121 is radiated to a radiation surface 122A of the radiating-concentrating section 122.

The radiating-concentrating section 122 has an approximately conical surface depressed downward, and is separated into the radiation surface 122A and a concentration surface 122B in the direction from the rotation axis AX to the circumference. The radiation surface 122A has a curved surface on which to reflect the light propagated from the light entrance section 121 in the diameter direction and to radiate the light throughout the incremental-purpose first light guiding section 123 and the absolute-purpose first light guides 1291. This curved surface is preferably set, when parallel light is radiated from the outer circumference in the diameter direction, to concentrate the light to the light emitter 111. In the approximately conical shape of the radiating-concentrating section 122, the concentration surface 122B is disposed further radially outward than the radiation surface 122A. The concentration surface 122B has a curved surface on which to reflect the light in the light receiver 112 direction when the light is propagated through the returning path and concentrated on the incremental-purpose first light guiding section 123 in the diameter direction toward the rotation axis AX. This curved surface is preferably set, when parallel light is radiated from the outer circumference in the diameter direction, to effect a focus of maximum concentration to the light receiver 112.

As shown in FIGS. 3 and 6 to 9, the incremental-purpose first light guiding section 123 has an approximately circular plate shape as if to cover the substrate 110. The incremental-purpose first light guiding section 123 radially guides, toward the outer circumference in the diameter direction, the light radiated on the radiation surface 122A, while at the same time guiding light on the returning path toward the inner circumference in the diameter direction.

As shown in FIGS. 3, 6, and other drawings, the direction conversion surface 124 is in the form of a ring-shaped surface of approximately 45° relative to the diameter direction on the radially outer circumference of the incremental-purpose first light guiding section 123. The direction conversion surface 124 reflects, in the downward direction, light propagated in the diameter direction on the incremental-purpose first light guiding section 123. When the incremental-purpose second light guiding section 125 propagates light upward, the direction conversion surface 124 reflects this light in the diameter direction toward the rotation axis AX.

The incremental-purpose second light guiding section 125 is ring-shaped under the ring-shaped direction conversion surface 124, and extends from the direction conversion surface 124 toward adjacent the mask 130 (fixed track T1) while covering the substrate 110 on its lateral side. Under the incremental-purpose second light guiding section 125, the radiation entrance surface 126 is disposed, which is an example of the approximately ring-shaped surface. Thus, light propagated through the forward path of the light guiding unit 120 is guided to adjacent the mask 130 by the incremental-purpose second light guiding section 125, and radiated to the mask 130 through the radiation entrance surface 126. Meanwhile, the returning light from the mask 130 and other elements enters the incremental-purpose second light guiding section 125 through the radiation entrance surface 126, and is propagated through the returning path by the light guiding unit 120.

The light exit section 127 includes four light exit sections 127A to 127D adjacent the light entrance section 121 at positions respectively corresponding to the light receivers 112A to 112D in the areas XA to XD. When light is propagated through the returning path and concentrated on the concentration surface 122B, the light exit sections 127A to 127D guide this light to adjacent their respective light receivers 112A to 112D, and radiate the light respectively toward the light receivers 112A to 112D.

The flange 128 protrudes from the outer circumference of the incremental-purpose second light guiding section 125 outward in the diameter direction. The flange 128 serves to secure the light guiding unit 120 to the housing (not shown) of the encoder 100.

The absolute-purpose light guiding section 129 is an example of the at least two second light guiding sections, and in this embodiment, includes four absolute-purpose light guiding sections 129 disposed at positions corresponding to boundaries between the four areas XA to XD, as shown in FIGS. 3 and 6 to 9. As shown in FIGS. 3 and 6 to 9, the absolute-purpose first light guides 1291 are each in the form of a wedge disposed at positions corresponding to the boundaries between the four areas XA to XD, and radially guide part of the light radiated on the radiation surface 122A toward the outer circumference in the diameter direction.

As shown in FIGS. 3, 6, and other drawings, the direction conversion surfaces 1292 are each in the form of a rectangular surface of approximately 45° relative to the diameter direction on the radially outer circumference of each absolute-purpose first light guide 1291. The direction conversion surfaces 1292 reflect, in the downward direction, light propagated in the diameter direction on the absolute-purpose first light guides 1291.

The absolute-purpose second light guides 1293 protrude toward the disc 140 side under the rectangular direction conversion surfaces 1292. The absolute-purpose second light guides 1293 pass through the through holes 115 of the substrate 110 and through an opening 131 of the mask 130, so as to extend from the direction conversion surfaces 1292 to adjacent the disc 140 (rotation track T3). At lower portions of the absolute-purpose second light guides 1293, the radiation surfaces 1294 are disposed. Thus, light propagated through the absolute-purpose first light guides 1291 is guided to adjacent the disc 140 by the absolute-purpose second light guides 1293, and radiated to the disc 140 through the radiation surfaces 1294. The returning light from the disc 140 and other elements originated from the radiation light of the radiation surfaces 1294 passes again through the opening 131 of the mask 130 and is received by the absolute detector 113.

The coating CO is disposed on a surface of the light guiding unit 120 other than the radiation entrance surface 126, the light entrance surface of the light entrance section 121, the light exit surfaces of the light exit sections 127, and the radiation surfaces 1294. The coating CO is made of a light-reflecting or light-shielding material. The coating CO eliminates or minimizes a leakage of light guided by the light guiding unit 120 to the outside, and eliminates or minimizes contamination of unnecessary, other light than the radiation light and the returning light into the light guiding unit 120. If the influence of leakage light and stray light is small, the coating CO may not necessarily be disposed.

As shown in FIG. 9, the light shield SP is disposed at positions corresponding to the boundaries between the four areas XA to XD so as to shield light crossing the areas XA to XD. That is, in this embodiment, one light shield SP is disposed at each of the four boundaries between the four areas XA to XD. With such light shields SP, the light guiding unit 120 is capable of guiding incident light from each of the areas XA to XD of the mask 130 to their respective light receivers 112A to 112D. This reduces noise components in the light reception signals.

The light shield SP will be described in more detail. As shown in FIG. 9 and other drawings, the light shield SP includes, in order from the rotation axis AX, a first light shield SP1, a second light shield SP2, and a third light shield SP3. At the first light shield SP1, the width of the light guiding unit 120 (the width on the surface perpendicular to the rotation axis AX) increases from the rotation axis AX toward the outer circumference in the diameter direction, and the thickness (the thickness in the rotation axis AX direction) is approximately uniform. The first light shield SP1 is the same as the absolute-purpose first light guide 1291. Specifically, the absolute-purpose light guiding section 129 includes, as its element, the first light shield SP1, and this can be viewed as such a configuration that the absolute-purpose second light guide 1293 protrudes from the first light shield SP1 to the disc 140 side. As shown in FIGS. 3, 7, and 8, the second light shield SP2 and the third light shield SP3 are formed as cut-outs of the light guiding unit 120. The above-described shape of the first light shield SP1 improves the mechanical strength of the light guiding unit 120 as an integral body. Additionally, the above-described shape of the first light shield SP1, while eliminating or minimizing diffusion of the forward path light, enhances the advantageous effect of appropriately eliminating or minimizing cross-talk of the returning path light between the areas XA to XD. The second light shield SP2 and the third light shield SP3 may not necessarily be cut-outs or the like, but instead may be made of a light-shielding material.

The above-described shape of the light guiding unit 120 ensures that the forward path light and the returning path light are propagated between the mask 130 and the light emitter 111 or between the light receiver 112 and the mask 130. Here, with the light shield SP, the light guiding unit 120 is capable of reducing light crossing the areas XA to XD, thereby reducing noise in the light reception signals. The light guiding unit 120 is also capable of propagating part of the forward path light to between the light emitter 111 and the disc 140. With the coating CO, the light guiding unit 120 is capable of eliminating or minimizing reception of leakage light and stray light, thereby further reducing noise in the light reception signals. Additionally, all the light guiding members, except some configuration, of the light guiding unit 120 can be integrally formed using the same material, and this ensures facilitated production in that, for example, a mold can be used for shaping.

Mask 130

Figure 10:
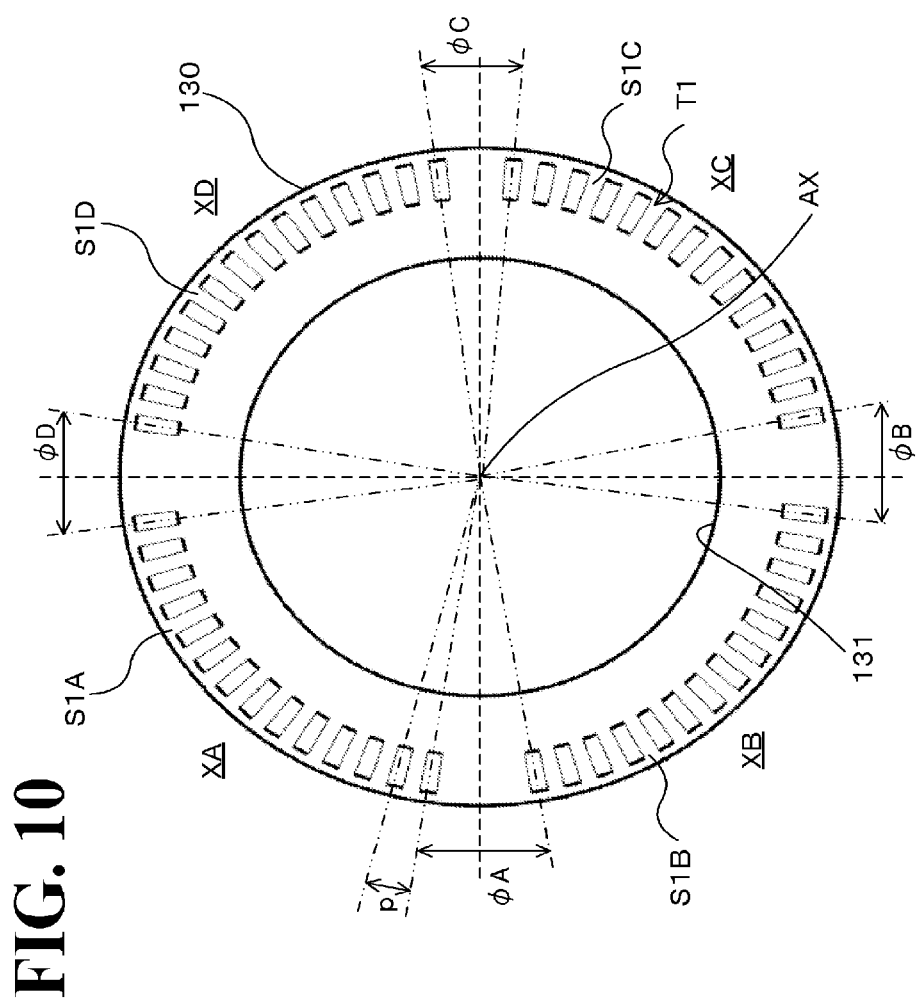
FIG. 10 is a diagram illustrating a configuration of a mask according to the embodiment.

The mask 130, at least its surface, is mainly made of a light-absorbing or light-diffusing material, and has a shape covering an upper surface of a rotation track T2 of the disc 140. The mask 130 is fixedly disposed at a position to shield light radiated by the light guiding unit 120. FIG. 10 shows a configuration of the mask 130. FIG. 10 is a diagram illustrating a configuration of the mask according to this embodiment. As shown in FIG. 10, the mask 130 includes a fixed track T1 and the opening 131.

The fixed track T1 is above (an example of one side in the axial direction) the rotation track T2 and set as a ring shape with the rotation axis AX serving as the center. The fixed track T1 has a shape corresponding to the rotation track T2. As shown in FIG. 10, the fixed track T1 is divided into four areas XA to XD in the circumferential direction (rotation direction). In each of the areas XA to XD, a plurality of fixed slits S1 are disposed.

As shown in FIG. 10, the plurality of fixed slits S1 are disposed in each of the areas XA to XD in a radial pattern at a uniform pitch (repetition interval) p with the rotation axis AX serving as the center. The fixed slits S1 permit forward path light and returning path light to transmit through the fixed slits S1. The plurality of fixed slits S1 disposed in the areas XA to XD will be respectively referred to as fixed slits S1A to S1D. That is, light transmitted through the fixed slits S1A is propagated through the area XA; light transmitted through the fixed slits S1B is propagated through the area XB; light transmitted through the fixed slits S1C is propagated through the area XC; and light transmitted through the fixed slits S1D is propagated through the area XD.

This will be described in more detail taking the plurality of fixed slits S1A as an example. The plurality of fixed slits S1A are disposed in the area XA of the fixed track T1. The plurality of fixed slits S1A are radially disposed at a uniform pitch p (for example, angle pitch) with the rotation axis AX serving as the center. For the fixed slits S1B to S1D, the pitch p is set at the same as the pitch p of the fixed slits S1A.

In the fixed track T1, a plurality of fixed slits S1 disposed in one area and a plurality of fixed slits S1 disposed in another area abutting the one area are formed to cause a phase difference, by which a rotation direction is detectable, between the light reception signals of the light receivers 112. Specifically, a plurality of fixed slits S1 disposed in one area are formed at a predetermined repetition period (pitch p) relative to an angle around the rotation axis AX. Whereas, a plurality of fixed slits S1 disposed in another area abutting the one area are formed at the same repetition period but with a phase difference. The phase difference is set at a level of phase difference by which the rotation direction of the disc 140, described later, is determinable. The preferable value of the phase difference varies depending on the number of divisions (four in this embodiment) of the fixed track T1 and on the resolution of the light reception signals. Still, setting the phase difference at a value more than 0° and less than 180° makes the rotation direction of the disc 140 determinable. This embodiment employs four divided areas, namely the areas XA to XD. In this case, the phase difference is preferably set at 90° or 180°. This makes the phase differences between the areas the same, and facilitates the production and the signal processing. In the following description of this embodiment, the phase difference between abutting areas is assumed 90° as an example.

This will be described in more detail taking a relationship between the fixed slits S1A and the fixed slits S1B, which abut one another in terms of phase, as an example. A slit interval □A (phase difference) is established between a fixed slit S1A positioned at the edge of the area XA on the side of the fixed slits S1B and a fixed slit S1B positioned at the edge of the area XB on the side of the fixed slits S1A. In this embodiment, since the phase difference is 90°, the slit interval □A is set at an odd multiple of a quarter of the pitch p. Similarly, the other slit intervals □B to □D are each set at an odd multiple of a quarter of the pitch p. When the phase difference is 180°, the slit intervals □A to □D are each set at an odd multiple of a half of the pitch p.

The opening 131 is disposed at a central position of the mask 130. The opening 131 is disposed at a position corresponding to an absolute-purpose rotating slit S3 (absolute-purpose rotating slits S31 to S37), described later. The absolute-purpose second light guides 1293 pass through the opening 131 to extend to adjacent the disc 140. The opening 131 releases heat originating from the light emitter 111 and other elements of the substrate 110. It is also possible to provide the shaft end 202 with a ventilator mechanism to rotate itself and send the resulting air to the substrate 110 through the opening 131, thereby releasing heat through the cut-outs of the light shield SP. In this case, the ventilator mechanism may be disposed in an opening 190 (see FIG. 3) of the shaft end 202.

Disc 140

Figure 11:
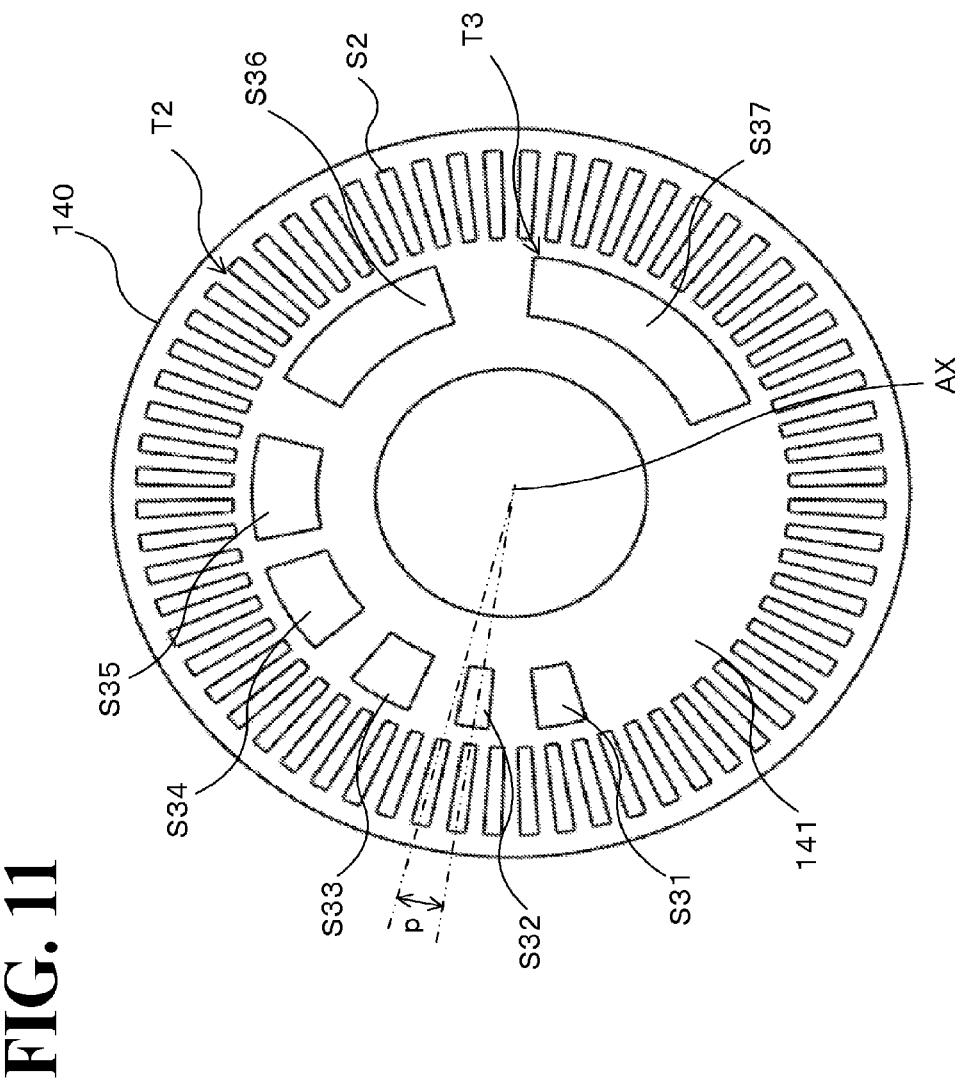
FIG. 11 is a diagram illustrating a configuration of a disc according to the embodiment.

As shown in FIG. 3, the disc 140 is fixed to the end 202 of the rotating shaft 201, to which the rotation output of the motor section 200 is transmitted. The disc 140 is disposed parallel to a surface perpendicular to the rotation axis AX, similarly to the mask 130, to the incremental-purpose first light guiding section 123 of the light guiding unit 120, to the substrate 110, and to other configurations. As shown in FIG. 3, the disc 140 includes a mask 141 and a light guiding section 142. The mask 141 includes the rotation track T2 and the rotation track T3, which are examples of the at least two rotation tracks. A configuration of the disc 140 will be described in more detail by referring to FIGS. 3 and 11. FIG. 11 is a diagram illustrating a configuration of the disc according to this embodiment. FIG. 11 is a view of the disc 140 on its mask 141 side surface (upper surface).

As shown in FIG. 11, the disc 140 is in the form of a circular plate with the rotation axis AX serving as the center. The mask 141 is disposed on the upper surface of the disc 140. While the position where the mask 141 is disposed is not particularly limited, the mask 141 is preferably disposed closer to the substrate 110 than reflection portions V1 and V2 of the light guiding section 142 are to the substrate 110.

The mask 141 is made of, for example, a light-absorbing or light-diffusing material that will not permit transmission or regular reflection of light. The mask 141, on the other hand, includes the rotation track T2 set therein, and in the rotation track T2, a plurality of light-transmitting rotating slits S2 are disposed. The mask 141 also includes the rotation track T3 set on the inner circumference side of the rotation track T2. The rotation track T3 includes the absolute-purpose rotating slit S3 (absolute-purpose rotating slits S31 to S37), which transmits light. These slits transmit light as opposed to the other portions of the mask 141.

The rotation track T2 is an example of the first rotation track, and has a ring shape set under the fixed track T1 of the mask 130 shown in FIG. 10 with approximately the same radius as the radius of the fixed track T1 with the rotation axis AX serving as the center. The rotating slits S2 are radially formed at the same pitch p as the pitch p of the fixed slits S1A to S1D with the rotation axis AX serving as the center. That is, the rotating slits S2 have an incremental pattern. Thus, when the disc 140 rotates, light is transmitted downward (to the light guiding section 142 side) only through part of the mask 141 in the areas XA to XD where the fixed slits S1A to S1D shown in FIG. 10 and the rotating slits S2 are aligned in the rotation axis AX direction.

The rotation track T3 is an example of the second rotation track, and disposed at a position where the distance from the rotation axis AX is similar to the distance from the rotation axis AX to the absolute detectors 113A to 113D. The absolute-purpose rotating slits S31 to S37 of the rotation track T3 have a predetermined absolute pattern, and light is transmitted downward when the absolute-purpose rotating slits S31 to S37 and the radiation surfaces 1294 of the absolute-purpose light guiding section 129 are aligned in the rotation axis AX direction. The absolute pattern of the absolute-purpose rotating slits S3 is set to avoid identical combinations of alignment with the radiation surfaces 1294 of the absolute-purpose light guiding sections 129 in the rotation axis AX direction within one rotation of the disc 140. That is, the absolute pattern of the absolute-purpose rotating slits S3 has combinations of alignment with the radiation surfaces 1294 in the rotation axis AX direction, and these combinations indicate absolute positions within one rotation.

As shown in FIG. 3, the light guiding section 142 includes a reflection portion V1, a reflection portion V2, and the coating CO.

The reflection portion V1 and the reflection portion V2 are disposed respectively under the rotating slits S2 and the absolute-purpose rotating slits S3. The reflection portion V1 and the reflection portion V2 reflect, in the upward direction, light transmitted through the rotating slits S2 and the absolute-purpose rotating slits S3 so as to transmit the light again through the rotating slits S2 and the absolute-purpose rotating slits S3. As shown in FIG. 3, the reflection portions V1 and V2 according to this embodiment each have a ring shape with a V-shaped protruding cross-section on the lower surface of the light guiding section 142. This ensures that when light is transmitted through these slits and proceeds in the downward direction along an optical path that is approximately parallel to the rotation axis AX, the reflection portions V1 and V2 displace this light in a diameter direction (the inner diameter direction for the reflection portion V1 and the outer diameter direction for the reflection portion V2), and reflect, this time in the upward direction, the optical path approximately parallel to the rotation axis AX. A view of returning path light at the reflection portion V1 shows that this returning path light is again transmitted through the rotating slits S2 and the fixed slits S1 to enter the light guiding unit 120 and be reflected on the direction conversion surface 124, with the result that the returning path light travels above the forward path light to reach the concentration surface 122B and be concentrated to the light receiver 112. A view of reflected light at the reflection portion V2 shows that this reflected light is again transmitted through the absolute-purpose rotating slits S3 and the opening 131 of the mask 130 to be received by the absolute detector 113.

This configuration of the reflection portion V1 and the reflection portion V2 is not intended in a limiting sense; any other configuration is possible insofar as the optical path is displaced in a diameter direction and reflected back to the slits. For example, the reflection portion V1 and the reflection portion V2 may be V-shaped grooves disposed on the upper surface of the light guiding section 142 (in which case the light guiding section 142 need not transmit light). It should be noted, however, that providing the reflection portion V1 and the reflection portion V2 as protrusions under the light guiding section 142 improves the mechanical strength of the disc 140, to which centrifugal force and signals are transmitted.

Figure 12:
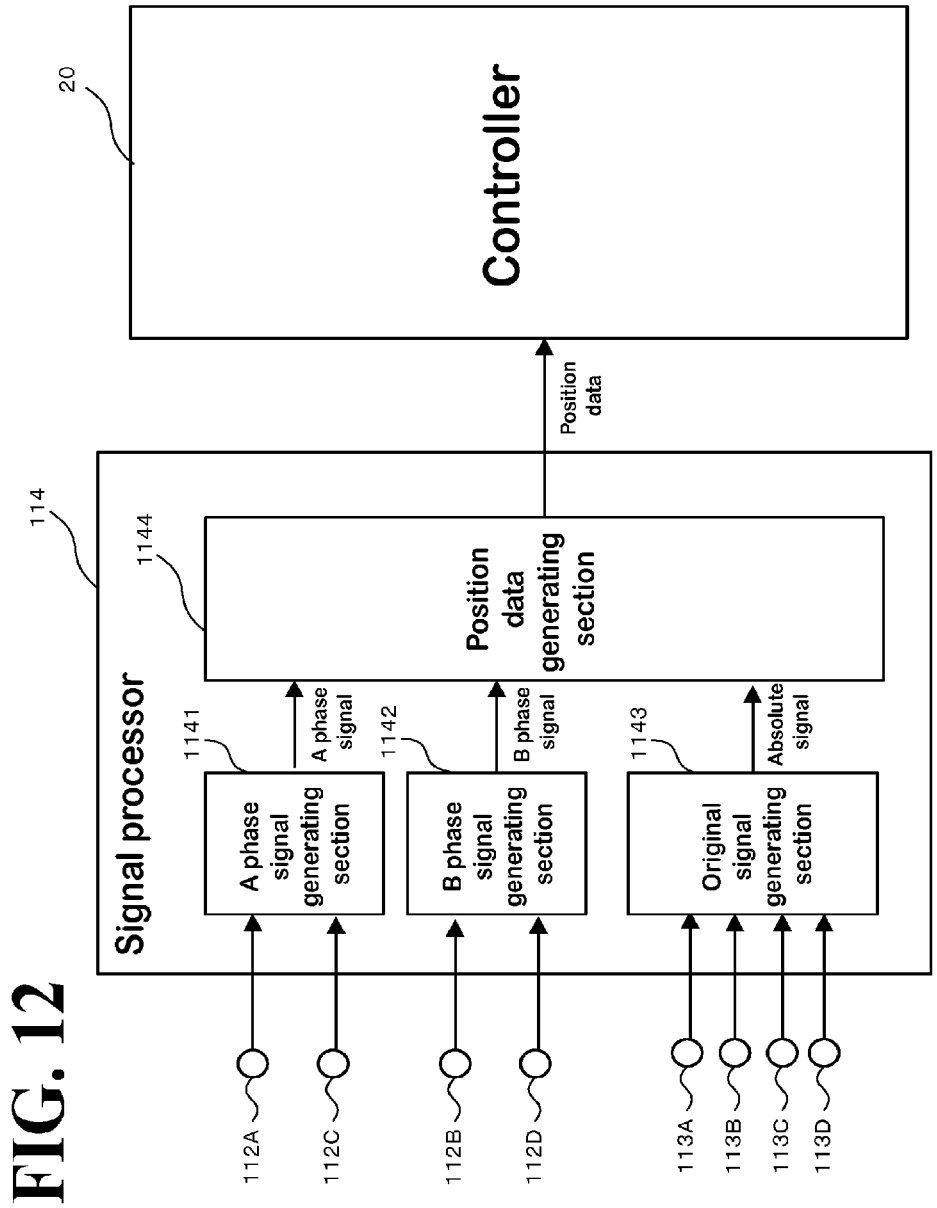
FIG. 12 is a diagram illustrating a configuration of a signal processor according to the embodiment.

Thus, a configuration of the encoder 100 according to the first embodiment of the present invention has been described hereinbefore. Next, an operation of the encoder 100 according to the first embodiment of the present invention will be described. A detailed configuration of the signal processor 114 of the encoder 100 will be described by referring to FIG. 12 in connection with the description of the operation. FIG. 12 is a diagram illustrating a configuration of the signal processor according to this embodiment.

1-3. Operation of Encoder According to the First Embodiment

As shown in FIG. 12, the signal processor 114 includes an A phase signal generating section 1141, a B phase signal generating section 1142, an absolute signal generating section 1143, and a position data generating section 1144. A configuration of each element will be described in connection with each's operation.

Absolute Signal Generating Operation

First, a generating operation of an absolute (absolute position) signal (absolute signal) will be described. This absolute signal generating operation is performed at the absolute signal generating section 1143 shown in FIG. 12. This will be described below in connection with light flow.

The light emitter 111 shown in FIGS. 3 and 4 radiates light toward the light entrance section 121 of the light guiding unit 120. The light that has entered the light entrance section 121 travels above the light entrance section 121 and is reflected in a diameter direction on the radiation surface 122A of the radiating-concentrating section 122 positioned on the rotation axis AX side. Then, the light is propagated in the outer circumference diameter direction through the absolute-purpose first light guide 1291. Then, this light is reflected further downward (to the mask 130 side) on the direction conversion surfaces 1292 and propagated downward along the absolute-purpose second light guides 1293. Then, the light is radiated from the radiation surfaces 1294 to the disc 140. The disc 140 rotates by the rotation of the motor section 200, and accordingly, the absolute-purpose rotating slits S31 to S37 in the predetermined pattern shown in FIG. 11 also rotate. As a result, when the absolute-purpose rotating slits S31 to S37 are aligned with any of the radiation surfaces 1294, the light is transmitted through the absolute-purpose rotating slits S31 to S37. The transmitted light is reflected on the reflection portion V2 of the light guiding section 142. The reflected light is again transmitted through the absolute-purpose rotating slits S31 to S37 and the opening 131 of the mask 130, and received by the photodetectors of the absolute detectors 113A to 113D. Thus, the absolute detectors 113A to 113D output a predetermined combination of light reception signals with periods in one rotation of the disc 140.

Then, the absolute signal generating section 1143 acquires the light reception signals from the absolute detectors 113A to 113D. From this combination of four light reception signals, the absolute signal generating section 1143 then estimates an approximate absolute position in one rotation. This absolute signal generation processing to indicate the absolute position by the absolute signal generating section 1143 can be implemented by various methods. For example, it is possible to store in advance in a table or the like a relationship between combinations of the four light reception signals and absolute positions, and to make an estimation from this relationship. The absolute signal generating section 1143 generates an absolute signal and outputs it to the position data generating section 1144.

A Phase Signal and B Phase Signal Generating Operation

Next, description will be made with regard to a generating operation, which is performed together with the absolute signal generating operation, of an A phase signal and a B phase signal corresponding to an incremental signal. This A phase signal and B phase signal generating operation is performed at the A phase signal generating section 1141 and the B phase signal generating section 1142. This will be described below in connection with light flow.

The light emitter 111 shown in FIGS. 3 and 4 radiates light toward the light entrance section 121 of the light guiding unit 120. The light that has entered the light entrance section 121 travels above the light entrance section 121 and is reflected in a diameter direction on the radiation surface 122A of the radiating-concentrating section 122 positioned on the rotation axis AX side. Then, the light is propagated toward approximately the entire outer circumference in the diameter direction through the incremental-purpose first light guiding section 123. Then, this light is reflected further downward (to the mask 130 side) on the direction conversion surface 124 and propagated downward along the incremental-purpose second light guiding section 125. Then, the light is radiated from the radiation entrance surface 126 to the mask 130. As shown in FIG. 10, the areas XA to XD of the mask 130 respectively include a plurality of fixed slits S1A to S1D arranged at a uniform pitch p with 90° phase difference between the fixed slits S1A to S1D. Thus, when the light guiding unit 120 radiates light, this light is transmitted through the fixed slits S1A to S1D and radiated to the disc 140 in the pattern of the fixed slits S1A to S1D.

In contrast, the rotating disc 140 includes the rotating slits S2 arranged at a uniform pitch p over the entire circumference of the rotating disc 140, as shown in FIG. 11. Hence, light is transmitted downward only through parts where the fixed slits S1A to S1D and the rotating slits S2 overlap, which depends on the position (angle) of the disc 140. Thus, the light that can be transmitted through the rotating slits S2 of the disc 140 is light that changes its intensity approximately in a sine-wave form within the period of time when the disc 140 rotates by one pitch p of the rotating slits S2. For the fixed slits S1A to S1D, the areas XA to XD are disposed with 90° or 180° phase difference between the areas XA to XD. Hence, when rays of light are transmitted through the disc 140 at positions corresponding to the areas XA to XD, these rays of light are in the form of approximate sine waves with 90° or 180° phase difference. That is, within the period of time when the disc 140 rotates by one pitch p, the rotating slits S2 sequentially match, for example, the fixed slits S1A of the area XA; the fixed slits S1B of the area XB; the fixed slits S1C of the area XC; and the fixed slits S1D of the area XD.

The light that has transmitted through the disc 140 in the above-described manner is transmitted through the light guiding section 142, which is disposed on the lower surface of the disc 140, as shown in FIG. 3. The light is then reflected inward in the diameter direction by the V-shaped reflection portion V1, and then again reflected upward (to the rotating slits S2 side). This light proceeds along a returning path that is in the direction opposite the forward path and that is displaced inward in the diameter direction. The light is sequentially transmitted through the rotating slits S2 and the fixed slits S1 to enter the light guiding unit 120. Then, this light is guided to the incremental-purpose second light guiding section 125 of the light guiding unit 120 from the radiation entrance surface 126, which is not applied the coating CO, and propagated upward along the incremental-purpose second light guiding section 125, which is opposite the case of the forward path. Then, the direction conversion surface 124 reflects and concentrates this light in the inner diameter direction (that is, to the rotation axis AX side). The light reflected on the direction conversion surface 124 had been passing further inward in the diameter direction than the forward path light before the reflection. Hence, after the reflection, the reflected light passes above the forward path light (in the direction away from the mask 130). Thus, this returning path light mainly reaches the concentration surface 122B of the radiating-concentrating section 122, as opposed to the forward path light. The light exit sections 127 are set to concentrate the optical path to adjacent the light receiving surface of the light receiver 112. Hence, the light reflected on the concentration surface 122B is propagated through the light exit sections 127 while being concentrated, and then is received by the light receiver 112.

As described above, the returning path light and other kinds of light are received by the light receivers 112A to 112D respectively through the fixed slits S1A to S1D at different timings between the areas XA to XD depending on the rotation of the disc 140. As shown in FIGS. 7, 8, and other drawings, the light guiding unit 120 includes the light shield SP to eliminate or minimize cross-talk of the rays of light that occurred in the areas XA to XD at the above-described different timings. As shown in FIGS. 4, 8, and 9, the light exit sections 127 and the light receivers 112A to 112D are disposed in their corresponding areas XA to XD. Thus, with the encoder 100 according to this embodiment, the light receivers 112A to 112D generate light reception signals in the form of sine waves with reduced noise and with 90° or 180° phase difference between the areas XA to XD. As shown in FIG. 12, the light reception signals in the light receiver 112A and the light receiver 112C, which are opposed to one another across the rotation axis AX, are output to the A phase signal generating section 1141 of the signal processor 114. The light reception signals in the light receiver 112B and the light receiver 112D, which are similarly opposed to one another across the rotation axis AX, are output to the B phase signal generating section 1142 of the signal processor 114.

The A phase signal generating section 1141 and the B phase signal generating section 1142 each acquire two light reception signals obtained from two light receivers that received light from two areas having a relationship of point symmetry. The A phase signal generating section 1141 and the B phase signal generating section 1142 each subtract (perform differential of) the two light reception signals so as to generate one signal. That is, two signals (A phase signal and B phase signal) are generated by the A phase signal generating section 1141 and the B phase signal generating section 1142.

Here, the fixed slits S1 in the areas disposed across the rotation axis AX have 180° phase difference in this embodiment. Accordingly, the two light reception signals that the A phase signal generating section 1141 and the B phase signal generating section 1142 each acquire have 180° phase difference. Such differential ensures that from the two light reception signals, a single A phase signal or a single B phase signal is generated in which errors, such as in the amount of displacement from the desired position, are offset. Specifically, referring to FIG. 10, if, for example, the rotation axis AX of the disc 140 is displaced from the desired position to the direction of the area XA and the area XC, an error resulting from this displacement occurs in the light reception signals from, among the areas, the area XA and the area XC. In terms of intensity of the light reception signals due to the error, however, the light reception signal of the area XA and the light reception signal of the area XC are opposite to one another. In view of this, as in this embodiment, the A phase signal generating section 1141 performs differential of the light reception signals so as to offset the error. Similarly, the B phase signal generating section 1142 is capable of offsetting an error that can occur when the rotation axis AX of the disc 140 is displaced from the desired position to the direction of the area XB and the area XD.

In the A phase signal and the B phase signal generated in the above-described manner, the fixed slits S1A and S1C and the fixed slits S1B and S1D have 90° phase difference by electrical angle. Thus, the rotation of the disc 140 by one pitch p equals one period of the A phase signal and the B phase signal, and the A phase signal and the B phase signal have 90° phase difference. Then, the A phase signal generating section 1141 and the B phase signal generating section 1142 respectively output the generated A phase signal and B phase signal to the position data generating section 1144. For improved resolution, the A phase signal generating section 1141 and the B phase signal generating section 1142 may multiply the generated A phase signal and B phase signal by a predetermined multiple and output the multiplied signals. In the course of generating the A phase signal and the B phase signal, the A phase signal generating section 1141 and the B phase signal generating section 1142 preferably subject the A phase signal and the B phase signal to analogue/digital conversion processing and signal amplification processing.

In this embodiment, the A phase signal generating section 1141 and the B phase signal generating section 1142 acquire two light reception signals of 180° phase difference, and therefore differential-amplify the two light reception signals. When, for example, the two light reception signals have 0° phase difference, it is possible to add the two light reception signals together to amplify them. This similarly ensures error offset.

Position Data Generation Operation

Lastly, description will be made with regard to the operation of generating position data from the absolute signal and from the A phase signal and the B phase signal. The position data generation operation is performed at the position data generating section 1144.

The position data generating section 1144 acquires the absolute signal and the A phase signal and the B phase signal generated in the above-described manner. Then, based on these signals, the position data generating section 1144 generates position data including the rotation direction of the disc 140. Specifically, based on the absolute signal, the position data generating section 1144 identifies an approximate absolute position (absolute position) of the disc 140 within one rotation. Then, the position data generating section 1144 subjects at least one of the A phase signal and the B phase signal to counting or other processing so as to identify a more specific absolute position than approximate absolute position. Then, the position data generating section 1144 checks whether the phase difference between the A phase signal and B phase signal is 90° or −90° so as to identify the rotation direction of the disc 140. Then, the position data generating section 1144 generates position data including the identified more accurate absolute position and the rotation direction, and outputs the position data to the controller 20.

1-4. Examples of Advantageous Effects of the First Embodiment

Thus, the encoder 100 according to the first embodiment of the present invention and the motor system 1 including the encoder 100 have been described hereinbefore. With the encoder 100 and other elements, light is radiated over approximately the entire circumference of the disc 140, and light reception signals are generated from signals obtained from the entire circumference. Thus, the encoder 100 and other elements ensure highly accurate position detection with reduced influence of error caused by displacement of the disc 140 or by other causes. Thus, the encoder 100 and other elements do not require highly accurate positioning of the disc 140 and other elements, and facilitate production of the encoder 100 and other elements.

Also with the encoder 100 and other elements, the light guiding unit 120 includes the incremental-purpose first light guiding section 123 and other elements and includes the absolute-purpose light guiding section 129. This enables the light guiding unit 120 to guide light radiated from the light emitter 111 to the at least two rotation tracks T2 and T3. This ensures identification of an approximate absolute position of the disc 140 within one rotation based on the absolute signal obtained from the rotation track T3, and ensures identification of a more specific absolute position than the approximate absolute position based on the incremental signal obtained from the rotation track T2, resulting in position data including a highly accurate absolute position. Thus, in an attempt to generate position data including a highly accurate absolute position, it is not necessary to prepare a plurality of light guiding units corresponding to the plurality of tracks set on the disc 140. Thus, the encoder 100 and other elements not only ensure reductions in parts count and production cost but also ensure a reduction in the size of the apparatus itself. Furthermore, this leads to reductions in raw materials to be used, and additionally, in energy consumption since there is no need to prepare a plurality of light emitters 111.

As described above, the absolute detector may be a receiving-emission integral device, as opposed to this embodiment. Still, using an absolute detector dedicated to receiving light as in this embodiment more effectively reduces power consumption. This reduction effect of power consumption significantly increases particularly in battery driven applications with no supply from external power sources.

Also with the encoder 100 and other elements, the absolute-purpose light guiding section 129 (the absolute-purpose second light guides 1293) is disposed in the first light shield SP1. Without the absolute-purpose light guiding section 129, when light is emitted from the light emitter 111 and radially guided, the part of the light that enters the light shield SP would not be put to use. In contrast, in this embodiment, the light that enters the light shield SP is guided by the absolute-purpose second light guides 1293 to the rotation track T3 to be used for absolute detection. Thus, the light from the light emitter 111 is used efficiently with minimal waste. Additionally, this configuration can be formed integrally as the light guiding unit 120. This ensures facilitated, low cost production in that, for example, the light guiding unit 120 can be formed into shape using a mold.

Furthermore, in the encoder 100 and other elements, a plurality of areas XA to XD are disposed in one track T1, and this ensures light reception signals of different phases obtained from the areas XA to XD. Thus, the encoder 100 and other elements eliminate the need for setting a plurality of tracks in the disc 140 and the mask 130 in an attempt to obtain light reception signals of a plurality of phases with which to detect the rotation direction, and eliminate the need for preparing a plurality of light guiding units corresponding to the plurality of tracks. Thus, the encoder 100 and other elements not only ensure reductions in parts count and production cost but also ensure a reduction in the size of the apparatus itself, similarly to the above-described case.

Here, with the encoder 100 and other elements, the fixed slits S1 are set to obtain, from areas opposed to one another across the axis, light reception signals of 0° or 180° phase difference by electrical angle. When the two light reception signals obtained from the areas have 180° phase difference, subtraction is performed, while when the phase difference is 0°, addition is performed. Thus, the encoder 100 and other elements eliminate or minimize degradation of the displacement error reduction effect. In this respect, while in this embodiment the track T1 has been illustrated as being divided into four, the number of divisions of the track T1 will not be particularly limited. Still, when the number of divisions is a multiple of four, the A phase signal or the B phase signal can be generated from the areas opposed to one another across the rotation axis AX, and this ensures a greater displacement error reduction effect. As the number of divisions increases, the displacement error reduction effect further improves.

Additionally, the encoder 100 and other elements include the light shield SP to eliminate or minimize cross-talk of light propagated to the areas XA to XD. This reduces noise that would be caused when the light reception signal intended for the A phase signal and the light reception signal intended for the B phase signal are propagated in the same light guiding unit 120. Thus, the encoder 100 and other elements ensure further highly accurate position detection. Furthermore, the encoder 100 efficiently uses the light shield SP, of which the absolute-purpose light guiding section 129 serves a part. This saves on a light source for absolute purposes and the resulting optical path.

2. Modifications

Figure 14:
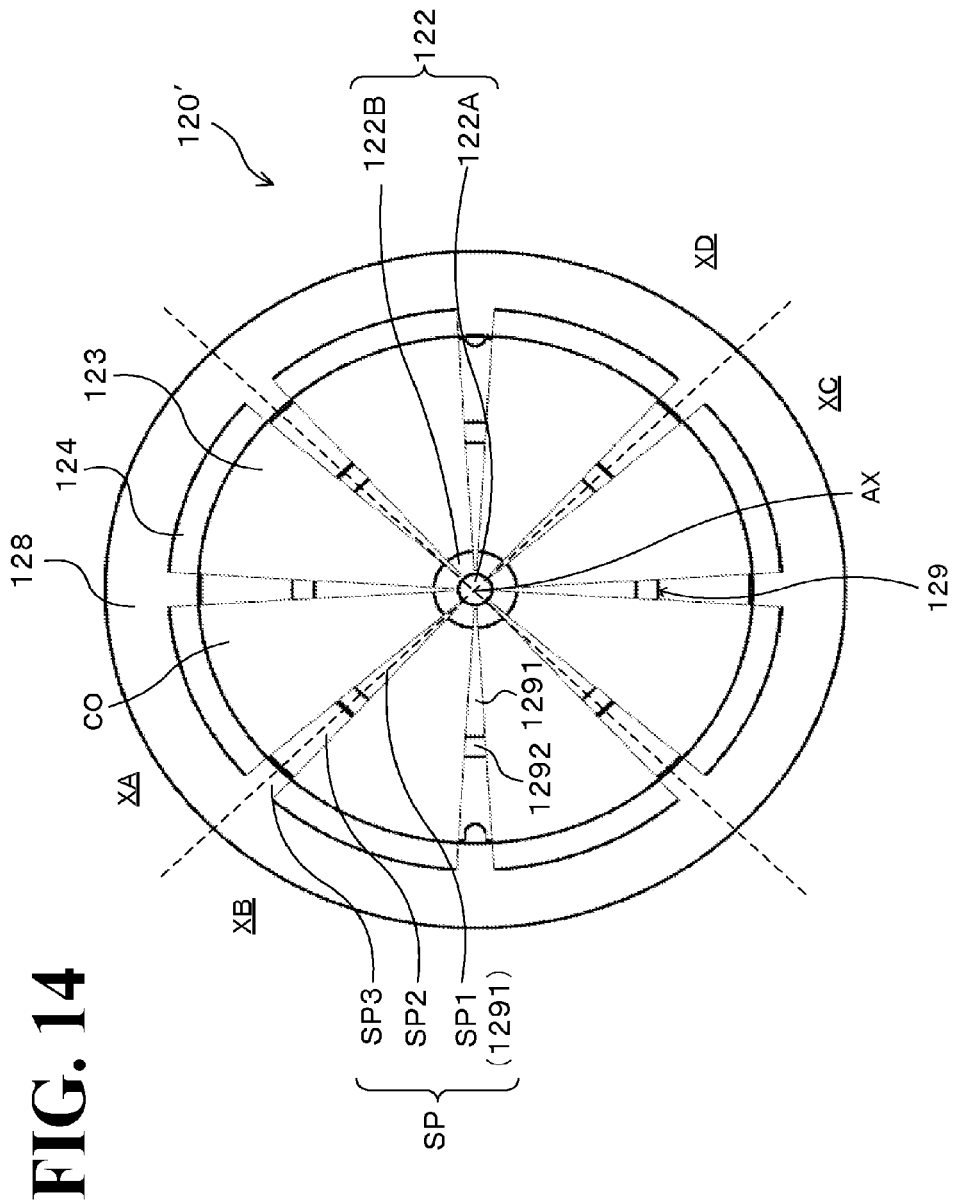
FIG. 14 is a diagram illustrating a configuration of a light guiding unit according to the modification.

In the above-described embodiment, the number of the absolute-purpose light guiding sections 129 is illustrated as the same as the number of the areas (four in the above-described embodiment) set on the mask 130. This, however, is not intended as limiting the number of the absolute-purpose light guiding sections 129. For example, as shown in FIGS. 13 and 14, the areas XA to XD each may be provided with an additional absolute-purpose light guiding section 129 at the center, in addition to the four positions corresponding to the boundaries between the four areas XA to XD, resulting in a total of eight absolute-purpose light guiding sections 129. FIG. 13 is a view, from an upper perspective, of a partial configuration of an encoder 100' according to this modification. FIG. 14 is a plan view of a light guiding unit 120' according to this modification.

In this case, the absolute pattern of the absolute-purpose rotating slits S3 is set to avoid identical combinations of alignment with the radiation surfaces 1294 of the eight absolute-purpose light guiding sections 129 in the rotation axis AX direction within one rotation of the disc 140, which is not particularly elaborated in the drawings. This modification increases the number of the absolute-purpose light guiding sections 129 over the above-described embodiment, and enhances the accuracy of the absolute position identified based on the absolute signal.

Also in the above-described embodiment, light reception signals obtained from areas among the areas XA to XD that abut one another in terms of phase have, for example, 90° phase difference. To this end, slit intervals □A to □D of 90° by electrical angle are disposed between the fixed slits S1A to S1X abutting one another in terms of phase. This example, however, is not intended as limiting the slit intervals □A to □D. Any other intervals are possible insofar as the phase difference between the light reception signals is more than 0° and less than 180° by electrical angle, which is equivalent, or more than equivalent, to the resolution of the light reception signals.

Also in the above-described embodiment, the reflection portions V1 and V2 have been illustrated as protrusions on the lower surface of the disc 140. However, various other configurations are possible insofar as the reflection portions V1 and V2 reflect forward path light transmitted through the rotating slits S2 along an optical path that is the same as or parallel to the forward path. Specifically, for example, the reflection portions V1 and V2 may be V-shaped grooves disposed at the rotating slits S2 themselves or under the rotating slits S2. In this case, the light guiding section 142 may not necessarily be disposed. When the forward path light and the returning path light are propagated on the same optical path, the rotating slits S2 themselves may be configured as reflection slits. For example, it is possible to provide a high-reflection coating on a part of a planar low-reflection member, specifically at the slit opening of the mask 141. This results in a structure that makes the light guiding section 142 unnecessary.

Also in the above-described embodiment, the light guiding unit 120 has been illustrated as a light guiding member having a plurality of reflecting surfaces and other elements. However, the light guiding unit 120 may also be, for example, an optical fiber capable of radiating light over the entire circumference or may be a bundle of such optical fibers.

Also in the above-described embodiment, absolute signals are obtained so as to finally make the encoder an absolute encoder. However, this absolute signal configuration may be otherwise than the above-described embodiment, and various other configurations are possible, whether they are optical, magnetic, resolvers, or mechanical. Furthermore, for an incremental encoder configuration, it will be readily appreciated that the absolute signal configuration is not necessary, and that the incremental encoder configuration can be implemented by employing a U, V, W-phase arrangement or a like arrangement for the arrangement of the absolute-purpose elements and the arrangement of the absolute-purpose slits.

Also in the above-described embodiment, the fixed track T1 is divided into a plurality of areas XA to XD so as to obtain light reception signals of different phases from the single rotation track T2. The fixed track, however, may not necessarily be divided into a plurality of areas. For example, to obtain a plurality of light reception signals of different phases, rotation tracks of different phases may be aligned in the diameter direction of the disc 140 so as to implement a multi-configuration, and the light guiding unit 120 may guide light to each of the plurality of rotation tracks.

Also in the above-described embodiment, the mask 130 has been illustrated as being disposed above (an example of one side in the axial direction) the disc 140. Contrarily, the mask 130 may be disposed under (an example of the other in the axial direction) the disc 140. In this case, the disc 140 may be made up of the mask 141 alone, and the light guiding section 142 including the reflection portion V1 and the reflection portion V2 may be disposed on the side of the mask 130 opposite the disc 140.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical entire-circumference encoder comprising:
a substrate comprising a first surface and a second surface;
a light source disposed on a rotation axis and disposed on the first surface of the substrate;
a disc disposed on the second surface of the substrate and rotatable about the rotation axis, the disc comprising a first rotation track and a second rotation track each comprising a plurality of rotating slits disposed around the rotation axis; and
a light guiding unit configured to radially guide light radiated from the light source toward an approximately entire outer circumferential area of the disc so as to guide the light to the first rotation track and the second rotation track, the light guiding unit comprising:
a first light guiding section comprising an approximately ring-shaped surface directly or indirectly opposed to a rotation track among the rotation tracks, the first light guiding section being configured to radially guide the light so as to make the light go out from the approximately ring-shaped surface toward the first rotation track; and
at least two second light guiding sections configured to guide part of the radially guided light to the second rotation track.

2. The optical entire-circumference encoder according to claim 1, further comprising a fixed track fixed to at least one of one side and another side of the disc in an axial direction of the fixed track, the fixed track comprising a plurality of fixed slits corresponding to the respective rotating slits of the first rotation track,
wherein the fixed track is divided into at least two areas in a circumferential direction of the fixed track,
wherein the first light guiding section comprises a plurality of light shields disposed at least at positions corresponding to boundaries between the at least two areas so as to shield light, and
wherein the second light guiding sections protrude from the light shields toward the disc so as to guide, to the second rotation track, the radially guided light that has entered the light shields.

3. The optical entire-circumference encoder according to claim 2,
wherein the first light guiding section is configured to concentrate light acting on the plurality of fixed slits and on the plurality of rotating slits while guiding the light toward adjacent the rotation axis,
wherein the first light guiding section further comprises at least two light receivers disposed adjacent the rotation axis, the at least two light receivers being configured to receive, in the respective at least two areas, the light guided by the first light guiding section, and
wherein the light receivers are configured to output light reception signals respectively for a plurality of fixed slits among the fixed slits of the fixed track disposed in one area among the at least two areas and for a plurality of fixed slits of the fixed track disposed in another area among the at least two areas abutting the one area, the light reception signals comprising a phase difference by which a rotation direction is determinable.

4. The optical entire-circumference encoder according to claim 3, wherein the fixed track is divided into areas of an integral multiple of four.

5. The optical entire-circumference encoder according to claim 2,
wherein the at least two areas of the fixed track have rotational symmetries relative to the rotation axis, the rotational symmetries being equal to a number of the at least two areas, and
wherein two light receivers among the at least two light receivers are configured to output two light reception signals for rotating slits among the plurality of rotating slits or fixed slits among the plurality of fixed slits disposed in two areas among the at least two areas having a relationship of point symmetry relative to the rotation axis, the light reception signals comprising a phase difference of 0° or 180° by electrical angle.

6. The optical entire-circumference encoder according to claim 5, further comprising a position data generating section configured to generate position data including a rotation direction of a rotating object based on a result of addition or subtraction of the light reception signals obtained from the two areas having a relationship of point symmetry.

7. A motor system comprising:
a motor configured to rotate a rotating shaft;

an optical entire-circumference encoder coupled to the rotating shaft to detect a position of the rotating shaft; and a controller configured to control rotation of the motor based on the position detected by the optical entire-circumference encoder, wherein the optical entire-circumference encoder comprises a substrate comprising a first surface and a second surface, a light source disposed on a rotation axis of the rotating shaft and disposed on the first surface of the substrate, a disc disposed on the second surface of the substrate and rotatable about the rotation axis, the disc comprising a first rotation track and a second rotation track each comprising a plurality of rotating slits disposed around the rotation axis, and a light guiding unit configured to radially guide light radiated from the light source toward an approximately entire outer circumferential area of the disc so as to guide the light to the first rotation track and the second rotation track, the light guiding unit comprising:

a first light guiding section comprising an approximately ring-shaped surface directly or indirectly opposed to a rotation track among the rotation tracks, the first light guiding section being configured to radially guide the light so as to make the light go out from the approximately ring-shaped surface toward the first rotation track; and at least two second light guiding sections configured to guide part of the radially guided light to the second rotation track.

8. The optical entire-circumference encoder according to claim 3, wherein the at least two areas of the fixed track have rotational symmetries relative to the rotation axis, the rotational symmetries being equal to a number of the at least two areas, and wherein two light receivers among the at least two light receivers are configured to output two light reception signals for rotating slits among the plurality of rotating slits or fixed slits among the plurality of fixed slits disposed in two areas among the at least two areas having a relationship of point symmetry relative to the rotation axis, the light reception signals comprising a phase difference of 0° or 180° by electrical angle.

9. The optical entire-circumference encoder according to claim 4, wherein the at least two areas of the fixed track have rotational symmetries relative to the rotation axis, the rotational symmetries being equal to a number of the at least two areas, and wherein two light receivers among the at least two light receivers are configured to output two light reception signals for rotating slits among the plurality of rotating slits or fixed slits among the plurality of fixed slits disposed in two areas among the at least two areas having a relationship of point symmetry relative to the rotation axis, the light reception signals comprising a phase difference of 0° or 180° by electrical angle.

10. The optical entire-circumference encoder according to claim 8, further comprising a position data generating section configured to generate position data including a rotation direction of a rotating object based on a result of addition or subtraction of the light reception signals obtained from the two areas having a relationship of point symmetry.

11. The optical entire-circumference encoder according to claim 9, further comprising a position data generating section configured to generate position data including a rotation direction of a rotating object based on a result of addition or subtraction of the light reception signals obtained from the two areas having a relationship of point symmetry.

* * * * *